(12) United States Patent
Kuriki et al.

(10) Patent No.: US 11,385,755 B2
(45) Date of Patent: Jul. 12, 2022

(54) CONDUCTIVE MEMBER FOR TOUCH PANEL AND TOUCH PANEL

(71) Applicant: FUJIFILM Corporation, Tokyo (JP)

(72) Inventors: Tadashi Kuriki, Kanagawa (JP); Masaya Nakayama, Kanagawa (JP); Makoto Suto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/734,886

(22) Filed: Jan. 6, 2020

(65) Prior Publication Data

US 2020/0142542 A1    May 7, 2020

Related U.S. Application Data

(63) Continuation of application No. PCT/JP2018/022853, filed on Jun. 15, 2018.

(30) Foreign Application Priority Data

Aug. 31, 2017    (JP) ............................. JP2017-166797

(51) Int. Cl.
   *G06F 3/044*    (2006.01)
(52) U.S. Cl.
   CPC .......... *G06F 3/0448* (2019.05); *G06F 3/0445* (2019.05); *G06F 3/0446* (2019.05); *G06F 2203/04112* (2013.01)
(58) Field of Classification Search
   CPC ...... G06F 3/044; G06F 3/0445; G06F 3/0446; G06F 3/0448; G06F 3/047; G06F 2203/04111; G06F 2203/04112
   See application file for complete search history.

(56) References Cited

U.S. PATENT DOCUMENTS

| 2012/0075238 A1* | 3/2012 | Minami | G09G 3/3611 |
| | | | 345/174 |
| 2013/0194232 A1* | 8/2013 | Imamura | G06F 3/0446 |
| | | | 345/174 |

(Continued)

FOREIGN PATENT DOCUMENTS

| JP | 2015-108884 A | 6/2015 |
| WO | 2014/156489 A1 | 10/2014 |
| WO | WO-2016152773 A1 * | 9/2016 ............ G06F 3/0416 |

OTHER PUBLICATIONS

International Search Report issued in PCT/JP2018/022853 dated Jul. 24, 2018.

(Continued)

*Primary Examiner* — Nathan Danielsen
(74) *Attorney, Agent, or Firm* — Edwards Neils LLC; Jean C. Edwards, Esq.

(57) ABSTRACT

A conductive member for a touch panel has a first electrode formed on a substrate and extending in parallel to a first direction, in which the first electrode is electrically connected to a plurality of first mesh cells constituted by a fine metal wire, the fine metal wire is not parallel or perpendicular with respect to a first direction, the first electrode has at least one auxiliary fine metal wire that extends in a first direction, intersects the fine metal wire, is electrically connected to the fine metal wire, and is not parallel to the fine metal wire, and an electrode width Wa of the first electrode in a second direction orthogonal to a first direction and a first mesh pitch $P_1$ of the first mesh cell in a second direction satisfy $Wa \leq 2.5 P_1$.

21 Claims, 9 Drawing Sheets

(56) References Cited

U.S. PATENT DOCUMENTS

| | | | |
|---|---|---|---|
| 2014/0041216 A1* | 2/2014 | Cok | H05K 1/0287 |
| | | | 29/846 |
| 2014/0225839 A1 | 8/2014 | Dunphy et al. | |
| 2015/0227242 A1 | 8/2015 | Cok | |
| 2015/0248186 A1* | 9/2015 | Oh | G06F 3/0446 |
| | | | 345/174 |
| 2016/0044778 A1 | 2/2016 | Irie et al. | |
| 2016/0274703 A1 | 9/2016 | Satou | |
| 2016/0306464 A1* | 10/2016 | Lee | G06F 3/0446 |
| 2017/0177120 A1* | 6/2017 | Kyutoku | G06F 3/041 |
| 2017/0308192 A1* | 10/2017 | Ogura | G06F 3/0446 |
| 2018/0024689 A1* | 1/2018 | Yoshiki | G06F 3/044 |
| | | | 345/173 |

OTHER PUBLICATIONS

Written Opinion of the International Seaching Authority issued in PCT/JP2018/022853 dated Jul. 24, 2018.
International Preliminary Report on Patentability issued in PCT/JP2018/022853 dated Mar. 3, 2020.
Office Action, issued by the Japanese Patent Office dated Dec. 15, 2020, in connection with Japanese Patent Application No. 2019-539001.

* cited by examiner

CONDUCTIVE MEMBER FOR TOUCH PANEL AND TOUCH PANEL

CROSS-REFERENCE TO RELATED APPLICATIONS

This application is a Continuation of PCT International Application No. PCT/JP2018/22853, filed on Jun. 15, 2018, which was published under PCT Article 21(2) in Japanese, and which claims priority under 35 U.S.C. § 119(a) to Japanese Patent Application No. 2017-166797, filed on Aug. 31, 2017. The above applications are hereby expressly incorporated by reference, in their entirety, into the present application.

BACKGROUND OF THE INVENTION

1. Field of the Invention

The present invention relates to a conductive member for a touch panel including an electrode which has a plurality of mesh cells constituted by a fine metal wire and at least one auxiliary fine metal wire electrically connected to the fine metal wire of the mesh cell and a touch panel.

2. Description of the Related Art

In a touch panel that has a mesh electrode obtained by using a fine metal wire as a touch detection electrode, it is possible to make a low resistance and a low parasitic capacitance compared to a touch panel obtained by using a transparent electrode formed of Indium Tin Oxide (ITO) as the detection electrode. For this reason, in a case where the mesh electrode obtained by using a fine metal wire is used, a highly sensitive touch panel can be obtained. Therefore, a touch panel having a mesh electrode obtained by using a fine metal wire has been actively employed recently and has attracted attention.

JP2015-108884A discloses a touch panel that has a mesh electrode obtained by using a fine metal wire. In the touch panel of JP2015-108884A, touch detection is improved by setting an average cell pitch of mesh cells of a second electrode arranged in an upper portion to be an integer multiple in a range of 2 to 8 times an average cell pitch of mesh cells of a first electrode arranged in a lower portion via an insulating layer.

In addition, in a touch panel that has a mesh electrode obtained by using a fine metal wire, in order to obtain high position detection accuracy (high definition) even with a stylus pen tip diameter of which is smaller than that of a fingertip, decreasing of an electrode width in a detection electrode, that is, reducing of the electrode width is now proceeded.

SUMMARY OF THE INVENTION

As described above, in the touch panel obtained by using the mesh electrode adapted to the decreasing of the electrode width of the detection electrode, that is, the reducing of the electrode width, it turned out that in many cases, the detection electrode is insulated due to disconnection of the fine metal wire or the like and touch cannot be detected, that is, the touch panel does not function as a touch panel. However, the present situation is that insulation of the detection electrode caused by the narrowing of the detection electrode cannot be suppressed and a sensitivity is low. Therefore, even in a case where the detection electrode is narrowed, a touch panel having a highly sensitive mesh electrode is desired.

An object of the present invention is to provide a conductive member for a touch panel and a touch panel that solve the above-described problems based on the related art and have a high definition and a high-sensitivity.

In order to achieve the object, there is provided a conductive member for a touch panel, comprising: a substrate; and a first electrode formed on the substrate and extending in parallel to a first direction, in which the first electrode is formed by electrically connecting a plurality of first mesh cells constituted by a fine metal wire, an angle $\theta$ between the fine metal wire and the first direction satisfies $0°<\theta<90°$ or $90°<\theta<180°$, the first electrode has at least one auxiliary fine metal wire extending in the first direction, intersecting the fine metal wire, and electrically connected to the fine metal wire, an angle $\beta$ between the auxiliary fine metal wire and the fine metal wire satisfies $0°<\beta<180°$, in the first electrode, an electrode width Wa that is a minimum width in a second direction orthogonal to the first direction and a first mesh pitch $P_1$ of the first mesh cell in the second direction satisfy $Wa \le 2.5P_1$, in which the first mesh pitch $P_1$ is an average value of distances in the second direction between centroids of two first mesh cells adjacent to each other in the second direction, and in a case where two first mesh cells are not arranged adjacent to each other in the second direction in the first electrode, a virtual centroid of a closed shape surrounded using an extension line formed by extending the fine metal wire constituting the first mesh cell in an extending direction is regarded as the centroid of the first mesh cell.

It is preferable that the electrode width Wa of the first electrode in the second direction and the first mesh pitch $P_1$ satisfy $Wa \le 1.5P_1$.

It is preferable that the auxiliary fine metal wire is arranged in an electrode outline of the first electrode in the second direction.

It is preferable that a line width of the auxiliary fine metal wire is different from a line width of the fine metal wire.

It is preferable that a line width of the auxiliary fine metal wire is smaller than a line width of the fine metal wire.

It is preferable that a line width of the auxiliary fine metal wire is larger than a line width of the fine metal wire.

It is preferable that the first electrode has only one auxiliary fine metal wire.

It is preferable that the auxiliary fine metal wire is a straight line and is parallel to the first direction.

It is preferable that the conductive member for a touch panel further comprises a connecting fine metal wire that connects the auxiliary fine metal wire and the fine metal wire with each other.

In addition, there is provided a touch panel comprising the above described conductive member for a touch panel.

It is preferable that the touch panel further comprises an opaque decorative layer, in which the auxiliary fine metal wire of the conductive member for a touch panel overlaps with the decorative layer in plan view.

According to the present invention, it is possible to obtain a conductive member for a touch panel and a touch panel having a high definition and a high-sensitivity.

DESCRIPTION OF THE PREFERRED EMBODIMENTS

Hereinafter, a conductive member for a touch panel and a touch panel of the present invention will be described in detail based on preferred embodiments shown in the accompanying drawings.

In addition, the drawings described below are an illustration for describing the present invention, and the present invention is not limited to the drawings shown below.

Further, hereinafter, "to" exhibiting a numerical value range includes numerical values indicated on both sides. For example, "ε is a numerical value α to a numerical value γ" means that the range of ε is a range including the numerical value α and the numerical value γ, and in a case of indicating by using mathematical symbols, $\alpha \leq \varepsilon \leq \gamma$.

Unless otherwise described, an angle such as "an angle represented by a specific numerical value", "parallel", "perpendicular", and "orthogonal" includes error ranges generally accepted in the art.

Further, "same" includes an error range generally accepted in the art. In addition, "all", "any", "entire surface", or the like includes an error range generally accepted in the art. "Transparent" means that a light transmittance is 40% or more, preferably 80% or more, and more preferably 90% or more with respect to the visible light wavelength range of 380 to 780 nm.

The light transmittance is measured by using "plastic—a method of obtaining total light transmittance and total light reflectance" regulated in Japanese Industrial Standards (JIS) K 7375:2008.

Figure 1:
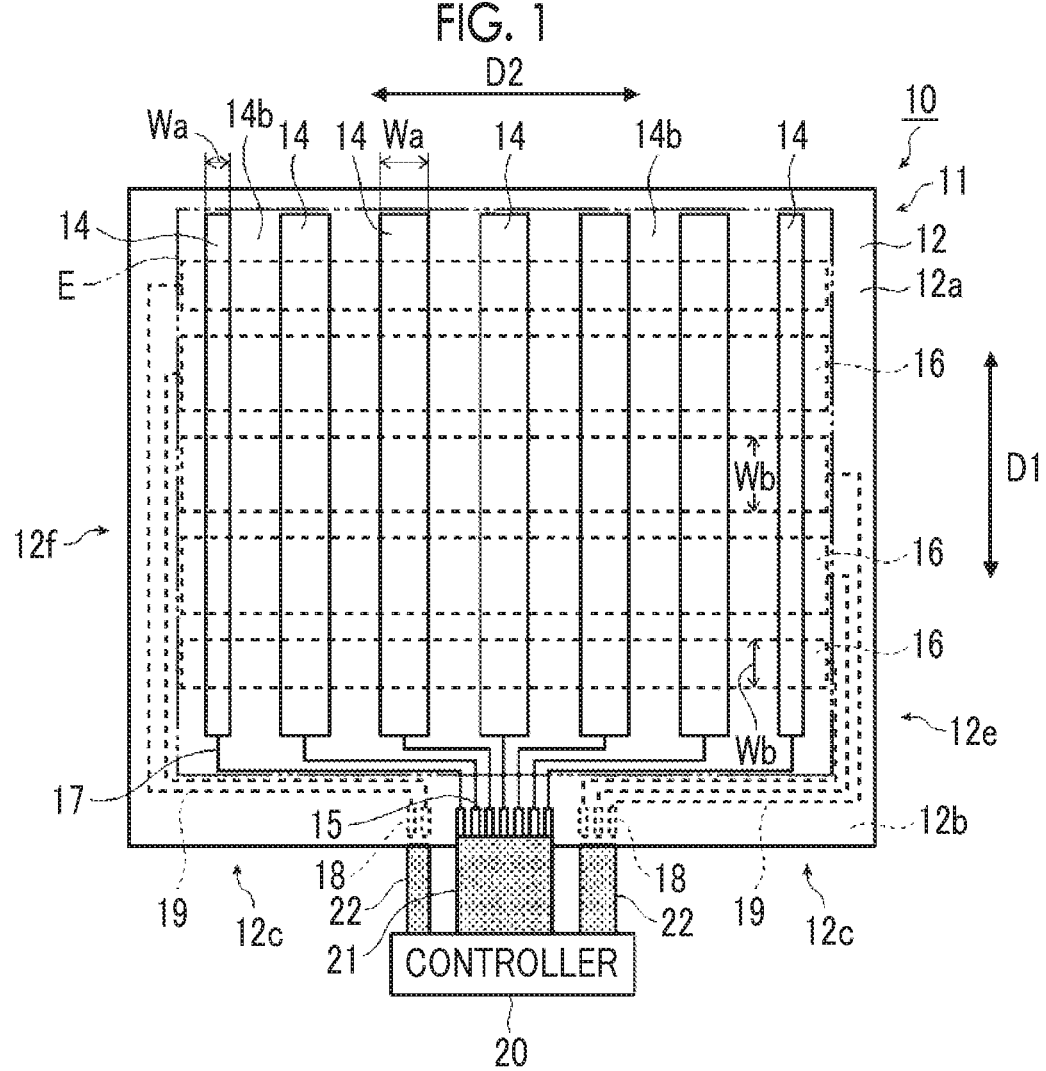
FIG. 1 is a schematic plan view showing a touch panel having a conductive member for a touch panel according to an embodiment of the present invention.
Figure 2:
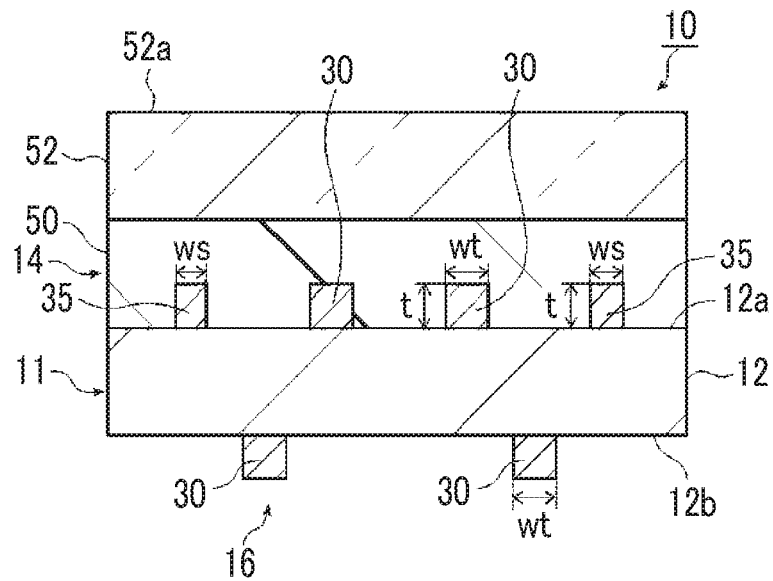
FIG. 2 is a schematic cross-sectional view showing an example of the touch panel of the conductive member for a touch panel according to the embodiment of the present invention.
Figure 3:
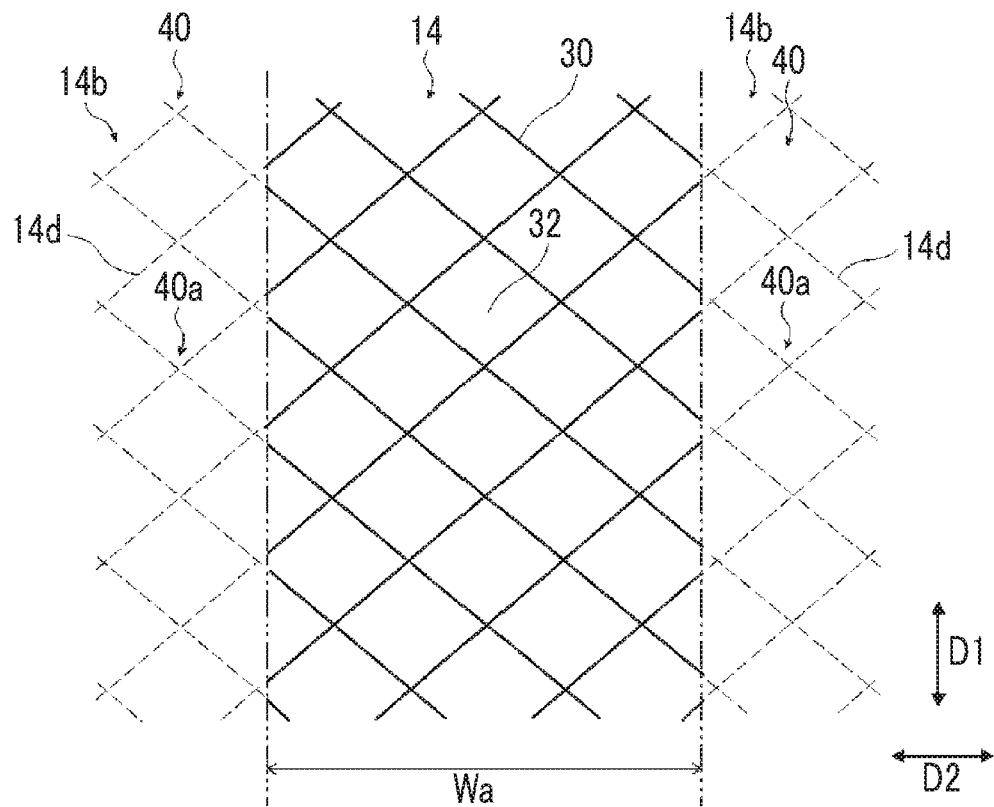
FIG. 3 is a schematic view showing a configuration of a first electrode of the conductive member for a touch panel according to the embodiment of the present invention.
Figure 4:
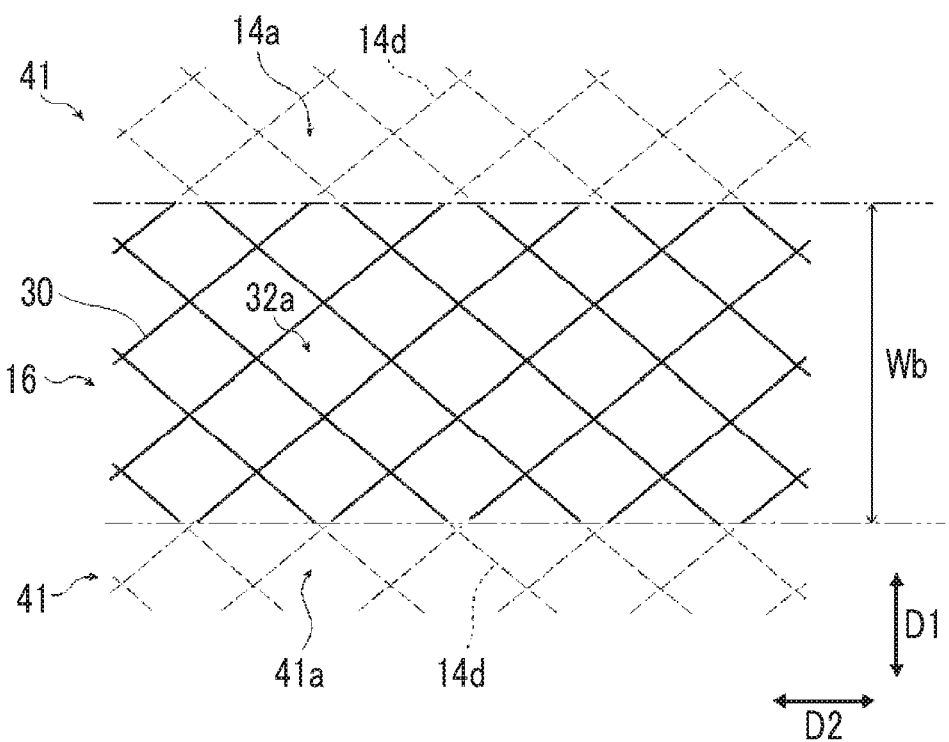
FIG. 4 is a schematic view showing a configuration of a second electrode of the conductive member for a touch panel according to the embodiment of the present invention.
Figure 5:
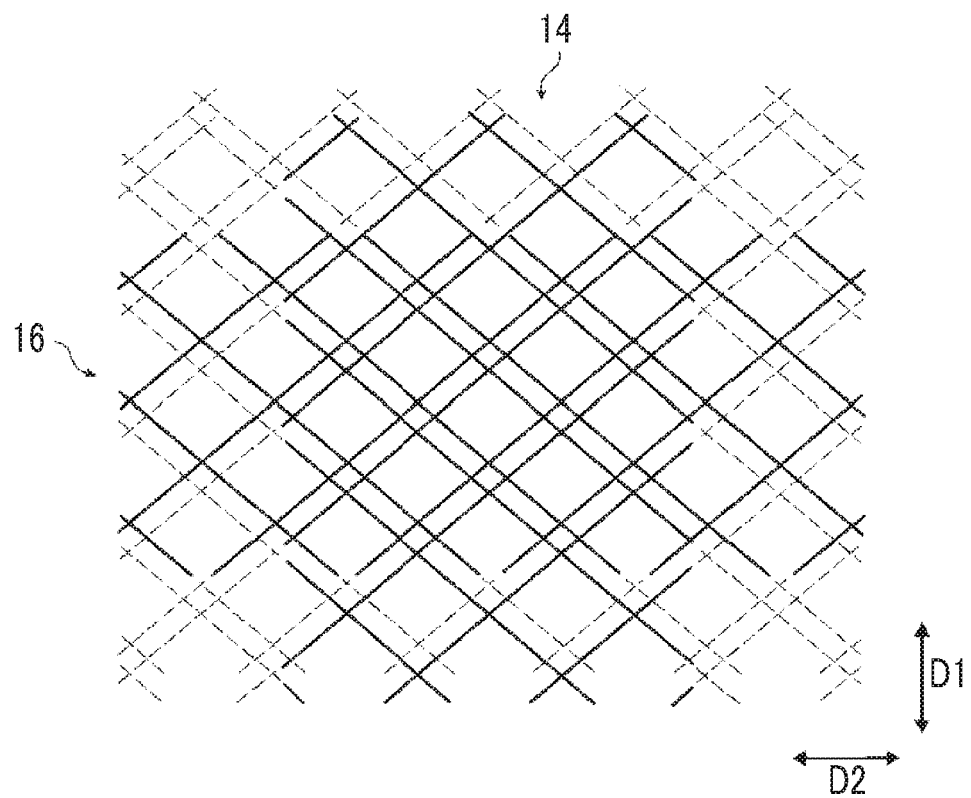
FIG. 5 is a schematic view showing a configuration of the first electrode and the second electrode of the conductive member for a touch panel according to the embodiment of the present invention.

FIG. 1 is a schematic plan view showing a touch panel having a conductive member for a touch panel according to an embodiment of the present invention, and FIG. 2 is a schematic cross-sectional view showing an example of the touch panel of the conductive member for a touch panel according to the embodiment of the present invention. FIG. 3 is a schematic view showing a configuration of a first electrode of the conductive member for a touch panel according to the embodiment of the present invention, FIG. 4 is a schematic view showing a configuration of a second electrode of the conductive member for a touch panel according to the embodiment of the present invention, and FIG. 5 is a schematic view showing a configuration of the first electrode and the second electrode of the conductive member for a touch panel according to the embodiment of the present invention. In addition, in FIG. 1, a transparent layer 50 and a cover layer 52 shown in FIG. 2 are not shown.

A touch panel 10 shown in FIG. 1 has a conductive member 11 for a touch panel, and the transparent layer 50 and the cover layer 52 are laminated on the conductive member 11 for a touch panel as shown in FIG. 2. A front surface 52a of the cover layer 52 is a touch surface of the touch panel 10 and serves as an operation surface. Further, the touch surface is a surface for detecting contact with a finger or a stylus pen.

For example, the touch panel 10 is arranged so as to overlap with a display panel (not shown), and in this case, the front surface 52a of the cover layer 52 is a visible surface of a display object (not shown) displayed in a display region (not shown) of the display panel.

Further, although not shown, the cover layer 52 may be provided with an opaque decorative layer for hiding an edge part wire that will be described later.

As shown in FIG. 1, the conductive member 11 for a touch panel includes a substrate 12 and a plurality of first electrodes 14 formed on a front surface 12a of the substrate 12 and extending in parallel to a first direction D1. The first electrode 14 functions as a detection electrode, and includes a mesh electrode in which a plurality of first mesh cells 32 constituted by a fine metal wire 30 are electrically connected to one another as shown in FIG. 3.

As shown in FIGS. 1 and 2, the plurality of first electrodes 14 are arranged in parallel at intervals therebetween in a second direction D2 orthogonal to the first direction D1 and are electrically insulated from one another. A plurality of first external connection terminals 15 are formed on an edge 12c of the front surface 12a of the substrate 12 in the first direction D1. The plurality of first external connection terminals 15 and the plurality of first electrodes 14 are electrically connected to each other by a plurality of first edge part wires 17, respectively.

As shown in FIGS. 1 and 2, a plurality of second electrodes 16 extending in parallel to the second direction D2 are formed on a back surface 12b of the substrate 12. Similarly to the first electrode 14, the second electrode 16 functions as a detection electrode, and includes a mesh electrode in which a plurality of second mesh cells 32a constituted by a fine metal wire 30 are electrically connected to one another as shown in FIG. 4.

As shown in FIG. 1, the plurality of second electrodes 16 are arranged in parallel at intervals therebetween in the first direction D1 and are electrically insulated from one another. A plurality of second external connection terminals 18 are formed on an edge 12c of the back surface 12b of the substrate 12 in the first direction D1. The plurality of second external connection terminals 18 and the plurality of second electrodes 16 are electrically connected to each other by a plurality of second edge part wires 19, respectively.

The plurality of first electrodes 14 and the plurality of second electrodes 16 are electrically insulated from each other by the substrate 12. A region in which the first electrode 14 and the second electrode 16 are arranged to overlap with each other in plan view is a sensing region E. The sensing region E is a sensing region at which contact with a finger or the like, that is, touch in the touch panel 10 is detected.

Further, FIG. 5 shows a view in which the overlapping portion of the first electrode 14 and the second electrode 16 is seen in plan view. In the overlapping portion, the fine metal wire 30 of the first electrode 14 and the fine metal wire 30 of the second electrode 16 are arranged so as to form a new mesh cell different from the first mesh cell 32 and the second mesh cell 32a.

As shown in FIG. 1, the first electrode 14 has an electrode width Wa in the second direction D2. Further, the electrode width Wa is defined as a minimum width of each first electrode 14 in the second direction D2. In FIG. 1, in an edge 12e and an edge 12f of the substrate 12 on the front surface 12a in the second direction D2, that is, the outermost first electrodes 14 arranged on the outermost side in the second direction D2, an electrode width Wa in the second direction D2 is smaller than an electrode width Wa of other first electrodes 14. By arranging the first electrode 14 having the smaller electrode width Wa in the edge 12e and the edge 12f in the second direction D2, that is, on the outermost side in the second direction D2, it is possible to reduce a parasitic capacitance, to improve a uniformity of a parasitic capacitance of an electrode, and to make a detection sensitivity in the sensing region E of the touch panel 10 uniform.

An arrangement position of the first electrode 14 having the smaller electrode width Wa is not limited to the edge 12e and the edge 12f, that is, the outermost side in the second direction D2, but as described above, from a viewpoint of a possibility to make a detection sensitivity in the sensing region E uniform, it is preferable to arrange the first electrode having the smaller electrode width at the edge 12e and the edge 12f.

In addition, as shown in FIG. 1, the second electrode 16 has an electrode width Wb in the first direction D1. Further, the electrode width Wb is defined as a minimum width of each second electrode 16 in the first direction D1. The electrode width Wb is not the same for all the second electrodes 16, and for example, the second electrode 16 arranged on the outermost side in the first direction D1 may be narrower. In the second electrode 16 as well, by arranging the second electrode 16 having the smaller electrode width Wb on the outermost side, it is possible to reduce a parasitic capacitance, to improve a uniformity of a parasitic capacitance of an electrode, and to make a detection sensitivity in the sensing region E of the touch panel 10 uniform.

An arrangement position of the second electrode 16 having the smaller electrode width Wb is not limited to the outermost side, but as described above, from a viewpoint of a possibility to make a detection sensitivity in the sensing region E uniform, it is preferable to arrange the second electrode having the smaller electrode width on the outermost side.

The plurality of first external connection terminals 15 are electrically connected to a controller 20 by a wire 21. The plurality of second external connection terminals 18 are electrically connected to the controller 20 by a wire 22.

As the controller 20, a well-known controller used for detection of a touch sensor is employed. In a case where the touch panel 10 is an electrostatic capacitive type, the controller 20 detects a position at which an electrostatic capacitance has changed due to the contact of a finger or the like on the front surface 52a of the cover layer 52 which is the touch surface. The touch panel 10 including the conductive member 11 for a touch panel is preferably used as an electrostatic capacitive type of touch panel. The electrostatic capacitive type of touch panel includes a mutual capacitive type of touch panel and a self-capacitive type of touch panel, and the touch panel including the conductive member for a touch panel is particularly suitable as the mutual capacitive type of touch panel. In a case of the mutual capacitance type, for example, the first electrode 14 is used as a sensing electrode and the second electrode 16 is used as a drive electrode.

Further, although not shown, the first electrode 14 and the first edge part wire 17 may be connected to each other via an electrode terminal, and the second electrode 16 and the second edge part wire 19 may be connected to each other via an electrode terminal. Regarding a shape of this electrode terminal, for example, a shape disclosed in JP2013-127657A can be used.

A configuration of the transparent layer 50 is not particularly limited as long as the transparent layer is optically transparent and has insulation properties, and can stably fix the conductive member 11 for a touch panel and the cover layer 52. The transparent layer 50 is made of, for example, an optical clear adhesive (OCA), an optical clear resin (OCR) such as an ultra violet (UV) curing resin, or the like.

The cover layer 52 is for protecting the conductive member 11 for a touch panel. A configuration of the cover layer 52 is not particularly limited. For the cover layer 52, for example, glass such as plate glass and chemically tempered glass, polycarbonate (PC), polyethylene terephthalate (PET), or an acrylic resin such as a polymethyl methacrylate (PMMA) resin is used. Since the front surface 52a of the cover layer 52 becomes a touch surface as described above, a hard coat layer may be provided on the front surface 12a as necessary. Further, the cover layer 52 has a thickness of 0.1 to 1.3 mm, in particular, preferably 0.1 to 0.7 mm.

The touch panel 10 is arranged so as to overlap with the display panel as described above. The display panel is not particularly limited as long as it has a display region (not shown). Examples of the display panel include a liquid crystal display panel, an organic electroluminescence (EL) display panel, and the like.

Figure 6:
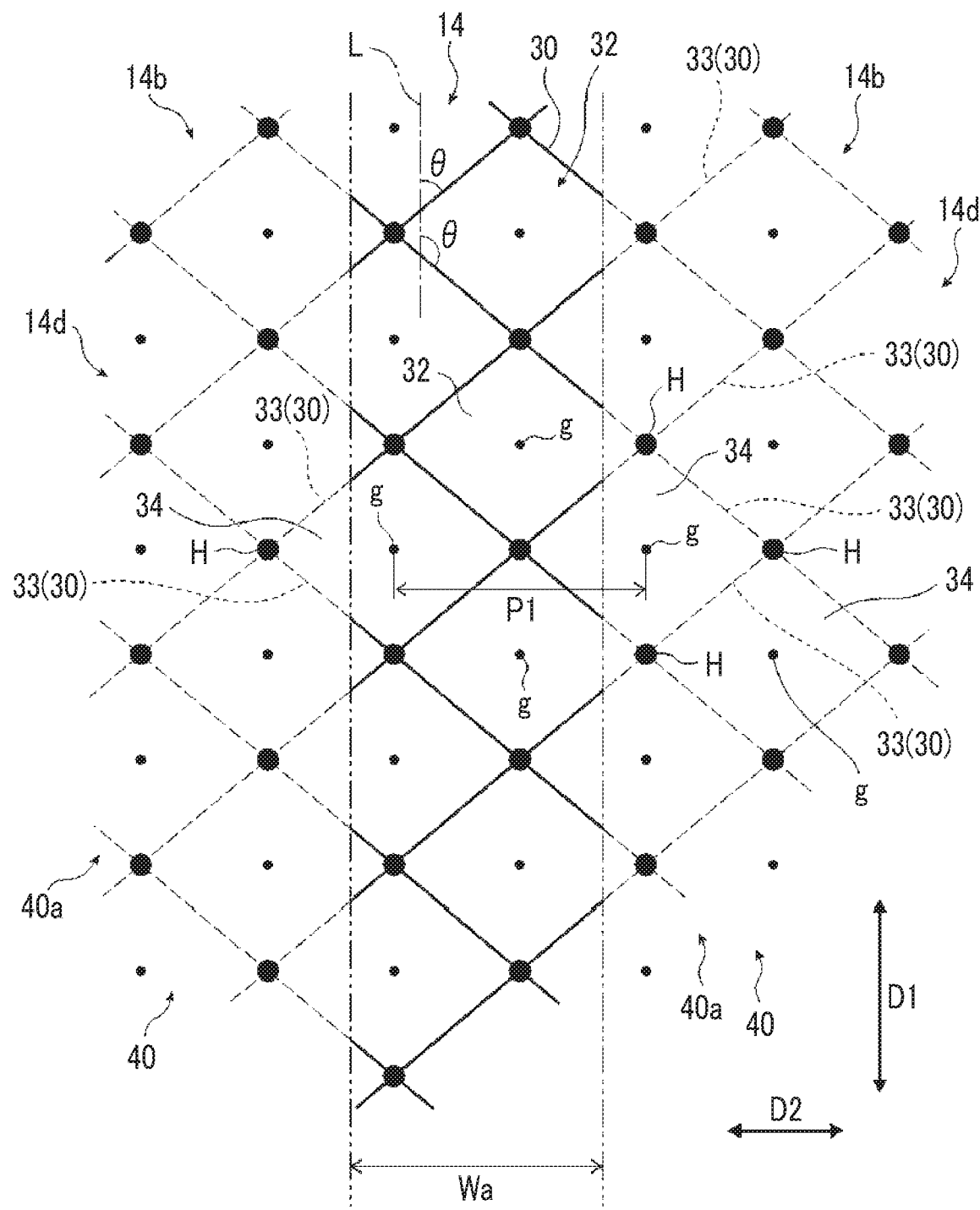
FIG. 6 is a schematic view showing a configuration of the first electrode of the conductive member for a touch panel according to the embodiment of the present invention.

As shown in FIG. 6, the first electrode 14 is formed by electrically connecting a plurality of first mesh cells 32 made of a fine metal wire 30. Further, in FIG. 6, an auxiliary fine metal wire is not shown.

An angle θ between the fine metal wire 30 and the first direction D1 satisfies 0°<θ<90° or 90°<θ<180°. That is, an angle θ between a straight line L parallel to the first direction D1 and the fine metal wire 30 satisfies 0°<θ<90° or 90°<θ<180° as described above. The fine metal wire 30 is not a parallel line or is not a perpendicular line with respect to the first direction D1.

The angle θ between the fine metal wire 30 and the first direction D1 satisfies preferably 10°≤θ≤80° or 100°≤θ≤170°, and more preferably 20°≤θ≤70° or 110°≤θ≤160°. An angle θ between the fine metal wire 30 and the first direction D1 is set so that moire generated due to interference between a pixel pattern of the display panel and the fine metal wire 30 is difficult to be visually recognized.

An angle θ between the fine metal wire 30 and the first direction D1 can be obtained as follows. First, in the first electrode 14, an image including the fine metal wire 30 is acquired and the image is input to a personal computer. In the personal computer, the fine metal wire 30 is extracted, and an angle θ between the fine metal wire 30 and the first direction D1 is specified. An angle θ is obtained. An angle θ can be obtained using, for example, commercially available graphic software.

In the first electrode 14, in a case where a first mesh pitch of the first mesh cell 32 of the first electrode 14 in the second direction D2 is $P_1$, the electrode width Wa and the first mesh pitch $P_1$ satisfy Wa≤2.5$P_1$, and preferably Wa≤1.5$P_1$. A high-definition touch panel can be provided by reducing the electrode width Wa of the first electrode 14. A lower limit value of the electrode width Wa of the first electrode 14 is 0.5 mm, and an upper limit value is 3 mm. In a case where the lower limit value is less than 0.5 mm, a detection sensitivity is deteriorated and the touch cannot be detected. In a case where the upper limit value is more than 3 mm, a resolution of touch detection is lowered, which is not preferable. In the first electrode 14, Wa≤2.5$P_1$ and it is possible to perform high-definition touch detection with a reduced electrode width, but the number of intersections formed by intersecting the fine metal wires 30 in the first electrode 14 is small.

The first mesh pitch $P_1$ is an average value of distances in the second direction D2 between centroids g of two first mesh cells 32 adjacent to each other in the second direction D2. The first mesh pitch $P_1$ will be described.

First, the centroids g of all the first mesh cells 32 in the first electrode 14 are obtained. In addition, in a case where the first mesh cell in the first electrode 14 is not a closed shape, as shown in FIG. 6, an intersection H at which extension lines 33 formed by extending the fine metal wires 30 constituting the first mesh cell 32 in an extending direction of the fine metal wire 30 are intersected each other is formed. A closed shape 34 surrounded by the fine metal wire 30 and the extension line 33 is created, and a virtual centroid of the closed shape 34 is obtained. The virtual centroid of the closed shape 34 is regarded as the centroid g of the first mesh cell 32. That is, the centroid is obtained assuming that the closed shape 34 surrounded using the extension line formed by extending the fine metal wires 30 constituting the first mesh cell 32 in an extending direction is the first mesh cell.

With respect to the first mesh cell 32 having the centroid g arranged in the first electrode 14, the distance in the second direction D2 between the centroids g of two first mesh cells 32 adjacent to each other in the second direction D2 is obtained. The mesh cells adjacent to each other in the second direction D2 are defined as adjacent mesh cells that share only a vertex of the mesh cell, not adjacent mesh cells that share a side of the mesh cell.

With respect to all the first mesh cells 32 each having the centroid g arranged in the first electrode 14, the distances in the second direction D2 between the centroids g of two first mesh cells 32 adjacent to each other in the second direction D2 are obtained, and an average value of the distances is defined as the first mesh pitch $P_1$ of the first electrode.

Further, in a case where the first mesh cell 32 has the same size and the same shape, all the distances in the second direction D2 between the centroids g of the two first mesh cells 32 adjacent to each other in the second direction D2 have the same value, and this value is the same as the first mesh pitch $P_1$.

The first electrode 14 shown in FIG. 6 is an example in which Wa=$P_1$. Two first mesh cells 32 are not arranged adjacent to each other in the second direction D2 in the first electrode 14. In this case, an intersection H at which extension lines 33 formed by extending the fine metal wires 30 constituting the first mesh cell 32 in an extending direction of the fine metal wire 30 are intersected each other is formed. A closed shape 34 surrounded by the fine metal wire 30 and the extension line 33 is created, and a virtual centroid of the closed shape 34 is obtained. The virtual centroid of the closed shape 34 is regarded as the centroid g of the first mesh cell 32.

With respect to all the first mesh cells each having a centroid g in the first electrode 14, an average value of the distances between the centroid g of the first mesh cell 32 and the virtual centroid of the closed shape 34 in the second direction D2 or distances between the virtual centroids of the closed shapes 34 in the second direction D2 is the first mesh pitch $P_1$.

A preferable range of the first mesh pitch $P_1$ is 100 μm or more and 2000 μm or less. A particularly preferable range is 600 μm or more and 1600 μm or less from a viewpoint that the parasitic capacitance of the electrode can be reduced and highly sensitive detection can be performed.

Further, the centroid g and the first mesh pitch $P_1$ of the first mesh cell 32 can be obtained as follows. First, an image including the first mesh cell 32 is acquired and the image is input to a personal computer. In the personal computer, the closed shape 34 is obtained as described above by extending the fine metal wire 30. Next, the first mesh cell 32 and the closed shape 34 are extracted. Next, coordinates of a vertex of the first mesh cell 32 and a vertex of the closed shape 34 are obtained. Next, the centroid of the first mesh cell 32 and the virtual centroid of the closed shape 34 are obtained using a method of obtaining the centroid position of a 2-dimensional plane.

From the obtained centroid of the first mesh cell 32 and the obtained virtual centroid of the closed shape 34, a centroid of the first mesh cell 32 or a virtual centroid of the closed shape 34, which is arranged adjacent thereto in the second direction D2 is extracted. The distance between the extracted centroid g of the first mesh cell 32 and the extracted virtual centroid of the closed shape 34 in the second direction D2 or the distance between the virtual centroids of the closed shapes 34 in the second direction D2 is obtained. Thereby, the first mesh pitch $P_1$ can be obtained.

Figure 7:
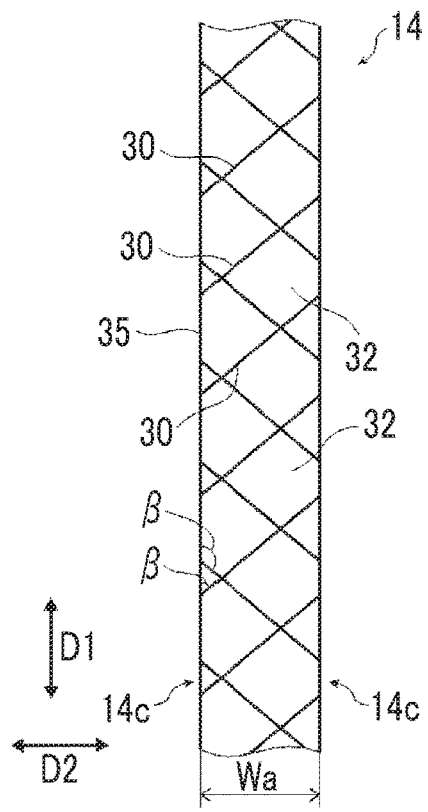
FIG. 7 is a schematic plan view showing a first example of the first electrode of the conductive member for a touch panel according to the embodiment of the present invention.

In an example shown in FIG. 7, the first electrode 14 has two auxiliary fine metal wires 35 that extend in the first direction D1, intersect the fine metal wire 30, and are electrically connected to the fine metal wire 30. In the example shown in FIG. 7, two auxiliary fine metal wires 35 are both straight and are parallel to the first direction D1. In addition, the auxiliary fine metal wire 35 is arranged at an electrode outline 14c that is an outermost position of the first electrode 14 in the second direction D2.

The auxiliary fine metal wire 35 has an angle β with any fine metal wire 30 such that 0°<β<180°. That is, the auxiliary fine metal wire 35 is not parallel to any fine metal wire 30. Since the auxiliary fine metal wire 35 and the fine metal wire 30 are not parallel to each other, the auxiliary fine metal wire 35 can be prevented from being disconnected, and a resistance of the first electrode 14 can be lowered.

In a case where the auxiliary fine metal wire 35 is parallel to the first direction D1, an angle β between the auxiliary fine metal wire 35 and the fine metal wire 30 is the same as an angle θ between the fine metal wire 30 and the first direction D1. In a case where the auxiliary fine metal wire 35 is parallel to the first direction D1, it is preferable because a resistance of the first electrode 14 can be further lowered.

An angle β between the auxiliary fine metal wire 35 and the fine metal wire 30 can be obtained as follows. First, in the first electrode 14, an image including the fine metal wire 30 and the auxiliary fine metal wire 35 is acquired and the image is input to a personal computer. In the personal computer, the fine metal wire 30 and the auxiliary fine metal wire 35 are extracted, and an angle β between the fine metal wire 30 and the auxiliary fine metal wire 35 is specified. An angle β is obtained. An angle β can be obtained using, for example, commercially available graphic software.

Further, the total length of the auxiliary fine metal wires 35 included in the first electrode 14 in the first direction is preferably 50% to 250% of a length of the first electrode. In addition, a length of one auxiliary fine metal wire 35 included in the first electrode 14 in the first direction is preferably 25% to 100% of a length of the first electrode, more preferably 80% to 100% of a length of the first electrode, and most preferably 100% of a length of the first electrode, that is, one auxiliary fine metal wire 35 is formed over the entire extension region of the first electrode.

As a result of intensive study of the inventor, it has been found that in the first electrode 14, in a case where a relationship between the electrode width Wa and the first mesh pitch $P_1$ is Wa≤2.5$P_1$, the insulation of the first electrode 14 remarkably occurs even in a case where a part of the fine metal wire 30 is disconnected.

This is because the number of fine metal wires 30 in the electrode and the number of connection points of the fine metal wires 30, that is, intersections of the fine metal wires 30 are reduced due to fining (narrowing) of the electrode, and thus a possibility that the first electrode 14 becomes electrically non-conductive due to disconnection of the fine metal wire 30 and the first electrode 14 is insulated is increased.

Figure 13:
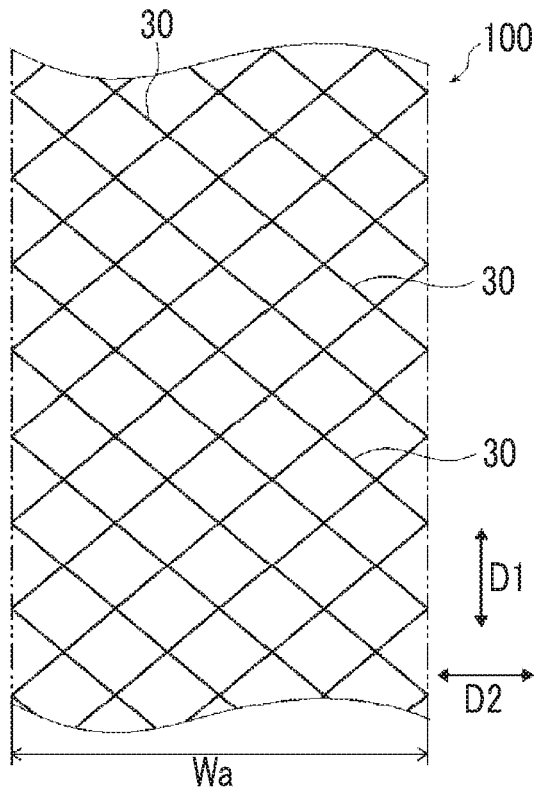
FIG. 13 is a schematic view showing a first example of a configuration of an electrode of the conductive member for a touch panel.

Specifically, an electrode 100 shown in FIG. 13 that satisfies Wa=4$P_1$ has a large number of fine metal wires 30 and a large number of connection points of the fine metal wires 30 in the electrode 100. For this reason, in the electrode 100 shown in FIG. 13, even though the auxiliary fine metal wire 35 is not provided, the insulation that is electrically non-conductive is difficult to occur even in a case where a part of the fine metal wire 30 is disconnected. However, since the electrode 100 has a large electrode width, a detection sensitivity for a stylus pen having a tip diameter smaller than that of the fingertip is poor.

Figure 14:
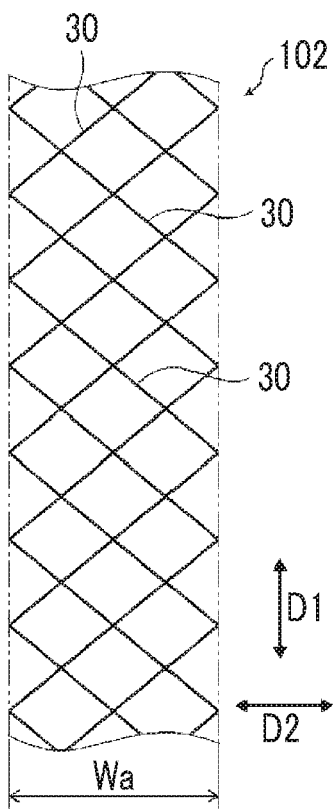
FIG. 14 is a schematic view showing a second example of a configuration of the electrode of the conductive member for a touch panel.
Figure 15:
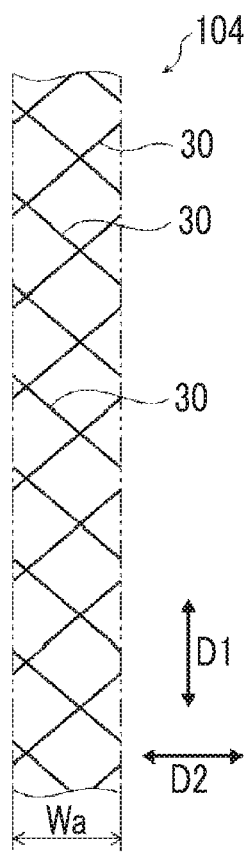
FIG. 15 is a schematic view showing a third example of a configuration of the electrode of the conductive member for a touch panel.

On the other hand, neither a narrowed electrode 102 shown in FIG. 14 satisfying Wa=2$P_1$ nor a narrowed electrode 104 shown in FIG. 15 satisfying Wa=$P_1$ is provided with the auxiliary fine metal wire 35. Since the electrode 102 and the electrode 104 have a small electrode width, there is a potential that a detection sensitivity for a stylus pen having a tip diameter smaller than that of the fingertip is high. However, as compared with the electrode 100 shown in FIG. 13, the number of fine metal wires 30 and the number of connection points of the fine metal wires 30 in the electrode are small, and even in a case where a part of the fine metal wire 30 is disconnected, the electrodes are insulated. In a case of being insulated, the electrode 102 and the electrode 104 do not function as a detection electrode.

In a case of Wa≤2.5$P_1$, the possibility that the first electrode 14 is insulated has increased, but by providing the auxiliary fine metal wire 35, the number of intersections can be increased even though the electrode width of the first electrode 14 is small, and the insulation of the first electrode 14 is suppressed. Thereby, it is possible to obtain a highly sensitive conductive member 11 for a touch panel and a highly sensitive touch panel 10 in which a detection sensitivity for the stylus pen having a tip diameter smaller than that of the fingertip can be increased even though the electrode has a high definition with a reduced electrode width.

Further, in FIGS. 13 to 15, with respect to the same components as those of the first electrode 14 shown in FIG. 7, the same reference numerals are assigned, and detailed description thereof is omitted.

Figure 8:
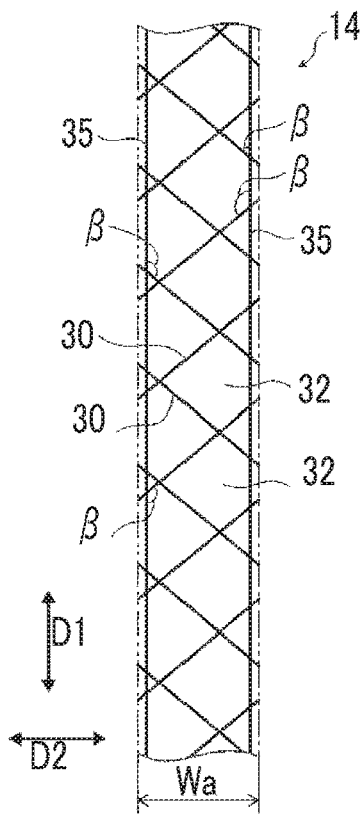
FIG. 8 is a schematic plan view showing a second example of the first electrode of the conductive member for a touch panel according to the embodiment of the present invention.
Figure 9:
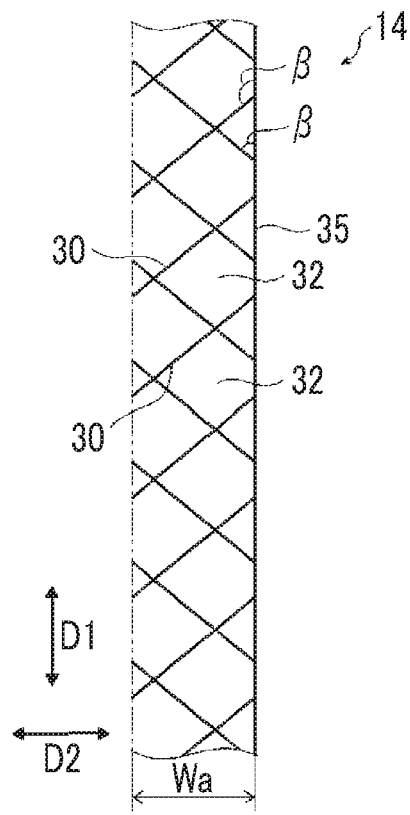
FIG. 9 is a schematic plan view showing a third example of the first electrode of the conductive member for a touch panel according to the embodiment of the present invention.

Further, the auxiliary fine metal wire 35 is not limited to being arranged at the electrode outline 14c of the first electrode 14 in the second direction D2 as shown in FIG. 7, but as shown in FIG. 8, the auxiliary fine metal wire may be provided in the first electrode 14 in the second direction D2. In addition, it is sufficient that only at least one auxiliary fine metal wire 35 is provided as shown in FIG. 9. Considering that the auxiliary fine metal wire 35 is visually recognized and a visibility of the first electrode 14 is deteriorated, one auxiliary fine metal wire 35 is preferable with respect to the first electrode 14 as shown in FIG. 9 and the auxiliary fine metal wire 35 is preferably arranged at the electrode outline 14c.

Figure 10:
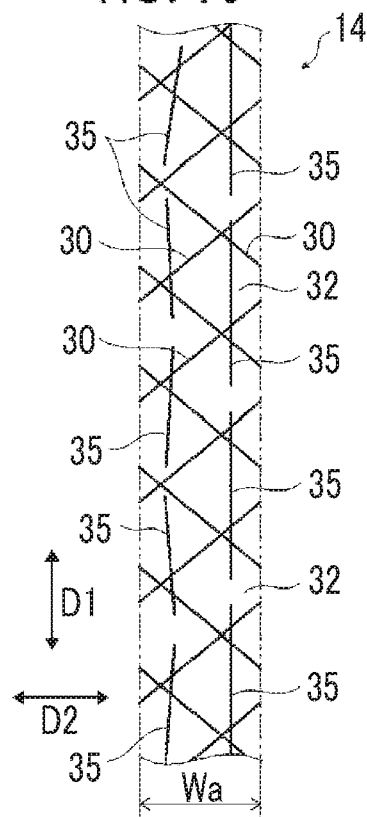
FIG. 10 is a schematic plan view showing a fourth example of the first electrode of the conductive member for a touch panel according to the embodiment of the present invention.

It is sufficient that as shown in FIG. 10, the auxiliary fine metal wire 35 only extends in the first direction D1. In this case, the auxiliary fine metal wire 35 may be parallel to or may not be parallel to the first direction D1.

Figure 11:
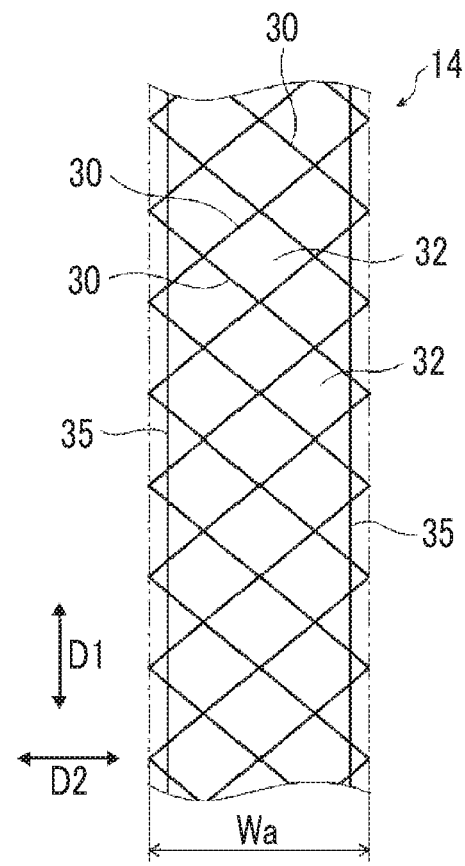
FIG. 11 is a schematic plan view showing a fifth example of the first electrode of the conductive member for a touch panel according to the embodiment of the present invention.

The first electrode 14 shown in FIG. 11 satisfies Wa=2$P_1$, and two auxiliary fine metal wires 35 are arranged in the first electrode 14 so as to be spaced in the second direction D2 at portions except for the electrode outline 14c.

Since the auxiliary fine metal wire 35 is provided on the first electrode 14, in a case where the first electrode 14 having the auxiliary fine metal wire 35 is arranged in the display region, there is a possibility that the auxiliary fine metal wire 35 is visually recognized in a case of being viewed from the touch surface of the touch panel 10, which may be a factor of reducing a visibility of the touch panel 10. For this reason, ideally, the auxiliary fine metal wire 35 has to be not visually recognized, but it is actually required to be difficult to be visually recognized. From this, it is preferable that a line width ws (see FIG. 2) of the auxiliary fine metal wire 35 is smaller than a line width wt (see FIG. 2) of the fine metal wire 30. More preferably, a line width ws of the auxiliary fine metal wire 35 is 80% or less of a line width wt of the fine metal wire 30. By reducing the line width ws of the auxiliary fine metal wire 35, the auxiliary fine metal wire 35 becomes difficult to be visually recognized, and a visibility of the touch panel conductive member 11 and the touch panel 10 is improved. In addition, in a case where the auxiliary fine metal wire 35 is fine, the intersection generated with the fine metal wire 30 is also reduced, and an influence on a visibility can be reduced. From a viewpoint of a visibility, a preferable range of a line width ws of the auxiliary fine metal wire 35 is 0.5 µm or more and 3 µm or less.

For example, in a case where the auxiliary fine metal wire 35 is provided only on the outermost first electrode 14 arranged at each of the edge 12e and the edge 12f as shown in FIG. 1, by overlapping the auxiliary fine metal wire 35 and the above described opaque decorative layer with each other in plan view, the auxiliary fine metal wire 35 can be made invisible. In that case, since it is not necessary to consider a visibility of the auxiliary fine metal wire 35, it is preferable that a line width ws of the auxiliary fine metal wire 35 is larger than a line width wt of the fine metal wire 30. By increasing a line width ws of the auxiliary fine metal wire 35, an effect of preventing insulation of the first electrode 14 by preventing disconnection of the auxiliary fine metal wire is increased, and a resistance of the first electrode 14 can be lowered, which is preferable because a high-sensitivity can be further achieved. In this case, a line width ws of the auxiliary fine metal wire 35 is more preferably 150% or more of a line width wt of the fine metal wire 30. From a viewpoint of preventing insulation and lowering resistance, a preferred range of a line width ws of the auxiliary fine metal wire 35 in this case is 5 µm or more and 50 µm or less, and more preferably 10 µm or more and 30 µm or less.

From the above, it is preferable that a line width ws of the auxiliary fine metal wire 35 and a line width wt of the fine metal wire 30 are different from each other.

For example, the fine metal wire 30 and the auxiliary fine metal wire 35 of the first electrode 14 have the same configuration as each other, and in this case, the auxiliary fine metal wire 35 can be formed simultaneously with the formation of the first electrode 14.

In addition, in the present invention, the first electrode 14 in which Wa≤2.5$P_1$ has the auxiliary fine metal wire 35, and in a case of the first electrode 14 in which Wa>2.5$P_1$, since a possibility of insulation of the first electrode 14 due to disconnection of the fine metal wire 30 is low, the auxiliary fine metal wire 35 may not be provided. For this reason, in the conductive member 11 for a touch panel and the touch panel 10, in a configuration in which a plurality of first electrodes 14 are included, with respect to the first electrode 14 in which Wa>2.5$P_1$, the auxiliary fine metal wire 35 may not be provided.

The second electrode 16 is not particularly limited, but for example, similarly to the first electrode 14, a plurality of second mesh cells 32a constituted by a fine metal wires 30 are electrically connected as shown in FIG. 4. For example, the second electrode 16 may be formed without the auxiliary fine metal wire 35.

Further, the second electrode 16 may have the same configuration as the first electrode 14 and may be provided with an auxiliary fine metal wire 35, in a case where an electrode width is Wa≤2.5$P_1$, similarly to the first electrode 14.

By forming the first electrode 14 and the second electrode 16 so that the first mesh cell 32 and the second mesh cell 32a have the same mesh shape as shown in FIGS. 3 to 5, in the touch panel 10, an excellent visibility can be obtained without conspicuousness of a difference between the plurality of first electrodes 14 and the plurality of second electrodes 16, in state of maintaining a detection sensitivity.

In addition, the first electrode 14 and the second electrode 16 may have exactly the same configuration as each other. In this case, the second electrode 16 is an electrode of the first electrode 14 which is arranged with an orientation changed. In addition, an electrode width Wa of the first electrode 14 and an electrode width Wb of the second electrode 16 may be the same as each other or may be different from each other. It may be Wa>Wb or Wb>Wa.

Figure 12:
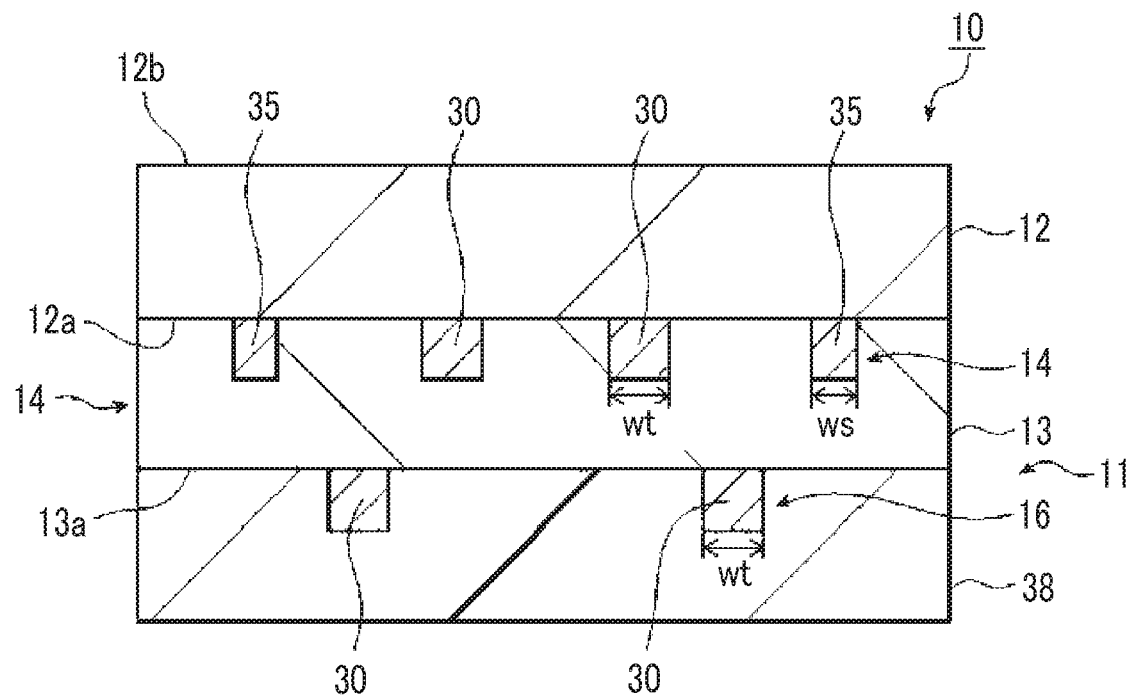
FIG. 12 is a schematic cross-sectional view showing another example of the touch panel of the conductive member for a touch panel according to the embodiment of the present invention.

In the touch panel 10 described above, the first electrode 14 is provided on the front surface 12a of one substrate 12 and the second electrode 16 is provided on the back surface 12b of the substrate 12, as shown in FIG. 2, but the present invention is not limited to this configuration. As the touch panel 10 shown in FIG. 12, it is possible to use a conductive member 11 for a touch panel in which the first electrode 14 is provided on the front surface 12a of one substrate 12, a transparent insulating film 13 is formed on the first electrode 14, and the second electrode 16 is provided on a first surface 13a of the transparent insulating film 13. In the touch panel 10 of FIG. 12, the substrate 12 can be used as the cover layer 52 described above, and in this case, the back surface 12b of the substrate 12 becomes a touch surface of the touch panel 10. If necessary, a transparent layer 38 may be provided on the second electrode 16 as shown in FIG. 12. Further, in FIG. 12, it is possible to employ a configuration that the first electrode 14 is provided on the front surface 12a of the substrate 12 and the second electrode 16 is provided on the first surface 13a of the transparent insulating film 13, but the second electrode 16 is provided on the front surface 12a of the substrate 12 and the first electrode 14 is provided on the first surface 13a of the transparent insulating film 13.

As another configuration, although not shown in the drawings, it is also possible to use a laminated conductive material for a touch panel in which a conductive member having the first electrode 14 formed on the substrate 12 and a conductive member having the second electrode 16 formed on another substrate different from the substrate 12 are bonded to each other via a transparent adhesive layer.

That is, any conductive member for a touch panel in which the first electrode 14 and the second electrode 16 are insulated and orthogonally arranged may be used.

As shown in FIG. 1, the plurality of first electrodes 14 are arranged at intervals therebetween in the second direction D2, but it is possible to arrange a dummy electrode 40 (see FIG. 3) in an inter-electrode 14b of the first electrodes 14 adjacent to each other. Similarly to the first electrode 14, the dummy electrode 40 (see FIG. 3) has a dummy pattern 40a constituted by a mesh cell formed by a plurality of non-electrically connected fine metal wires 14d, and is not electrically connected to the first electrode 14 adjacent in the second direction D2.

The non-electrically connected fine metal wire 14d does not have a non-conductivity (insulation) per se, but is not electrically connected to (insulated from) the fine metal wire 30 constituting the first electrode 14. The non-electrically connected fine metal wire 14d and the fine metal wire 30 can be formed of the same material. The dummy electrode 40 (see FIG. 3) is an electrode that is electrically floating and does not function as a detection electrode. By arranging such a dummy electrode 40 (see FIG. 3) in the inter-electrode 14b of the plurality of first electrodes 14, in a case where the conductive member 11 for a touch panel is used for the touch panel 10, a space of the inter-electrode 14b of the plurality of first electrodes 14 becomes inconspicuous and it is possible to improve a visibility.

For example, the first electrode 14 and the dummy electrode 40 can be formed by patterning a metal film formed on the entire front surface 12a of the substrate 12 into a mesh shape. From a viewpoint of a visibility, it is preferable that the extension line 33 extending in an extending direction from the fine metal wire 30 of the first electrode 14 shown in FIG. 7 to be extrapolated coincides with the dummy pattern 40*a* constituted by the non-electrically connected fine metal wire 14*d* of the dummy electrode 40.

Further, similarly to the dummy electrode 40 respectively arranged in the inter-electrodes 14*b* of the plurality of first electrodes 14, dummy electrodes 41 constituted by the non-electrically connected fine metal wire 14*d* as shown in FIG. 4 can be respectively arranged in inter-electrodes of the plurality of second electrodes 16. A space of the inter-electrode 14*b* of the plurality of second electrodes 16 becomes inconspicuous, and a visibility of the touch panel 10 is improved.

As shown in FIGS. 3 and 4, a disconnection portion may be provided on each side of the mesh cell constituting the dummy patterns 40*a* and 41*a* of the dummy electrodes 40 and 41. From a viewpoint of a insulation and a visibility, a width of the disconnection portion is preferably 5 µm or more and 25 µm or less.

A sixth example of the first electrode according to another embodiment of the present invention will be described with reference to FIG. 16. The embodiment of FIG. 16 has a configuration in which a connecting fine metal wire 36 is newly provided in the embodiment of FIG. 7. The connecting fine metal wire 36 connects the auxiliary fine metal wire 35 and the fine metal wire 30 with each other. By providing the connecting fine metal wire 36, the insulation of the first electrode 14 can be further prevented, and the first electrode 14 can be further lowered in resistance. A line width of the connecting fine metal wire 36 is not particularly limited, but is preferably 0.5 µm or more and 50 µm or less. The line width of the connecting fine metal wire 36 may be the same as the line width wt of the fine metal wire 30, but is preferably different from the line width wt of the fine metal wire 30 similarly to the auxiliary fine metal wire 35. From a viewpoint of preventing insulation of the first electrode 14 and lowering the resistance, the line width of the connecting fine metal wire 36 is preferably larger than the line width of the fine metal wire 30, and more preferably 150% or more of the line width wt of the fine metal wire 30. In a case where the line width of the connecting fine metal wire 36 is larger than the line width wt of the fine metal wire 30, since a visibility of the first electrode 14 is deteriorated by the connecting fine metal wire 36, the connecting fine metal wire preferably overlaps with the above described opaque decorative layer of the touch panel in plan view similarly to the auxiliary fine metal wire 35. In a case where the connecting fine metal wire 36 is in the display region, similarly to the auxiliary fine metal wire 35, from a viewpoint of a visibility, the line width of the connecting fine metal wire 36 is preferably smaller than the line width wt of the fine metal wire, and more preferably 80% or less of the line width wt of the fine metal wire 30.

Figure 16:
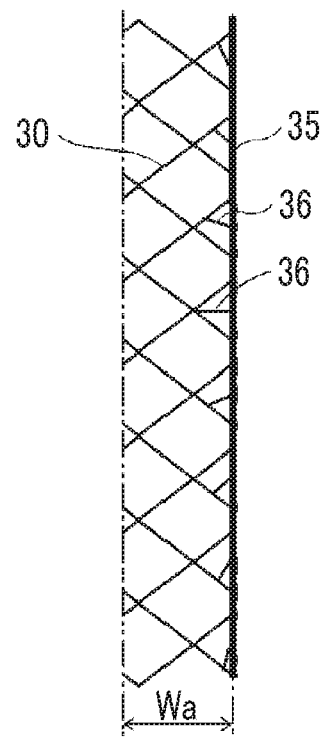
FIG. 16 is a schematic plan view showing a sixth example of the first electrode of the conductive member for a touch panel according to the embodiment of the present invention.

As shown in FIG. 16, it is preferable that the angle between the connecting fine metal wire 36 and the auxiliary fine metal wire 35 is not a constant value, but is random or has a non-periodicity. Thereby, the connecting fine metal wire 36 becomes difficult to be visually recognized. In addition, from a viewpoint of a visibility, it is preferable that the line width of the connecting fine metal wire 36 and the line width ws of the auxiliary fine metal wire 35 become the same as each other, which causes the connecting fine metal wire 36 and the auxiliary fine metal wire 35 to be inconspicuous.

The shorter the length of the connecting fine metal wire 36 is, the more preferable it is from a viewpoint of a visibility, and thus, it is preferable that the connecting fine metal wire 36 extending from the auxiliary fine metal wire 35 is not extended from the first intersection with the fine metal wire 30. From a viewpoint of a visibility, the length of the connecting fine metal wire 36 is preferably 200 µm or less, more preferably 100 µm or less, and still more preferably 60 µm or less.

The connecting fine metal wire 36 can have the same configuration as the auxiliary fine metal wire 35, and is preferably formed of the same material and at the same time in the same process as the auxiliary fine metal wire 35.

The thickness of the connecting fine metal wire 36 is not particularly limited, but is preferably 0.01 µm or more and 9 µm or less, and preferably the same as the thickness t of the auxiliary fine metal wire 35.

Hereinafter, each part of the conductive member for a touch panel and the touch panel will be described.

<Substrate>

In a case where the substrate 12 can support at least the first electrode 14 and the second electrode 16, the kind is not particularly limited. The substrate 12 is preferably a transparent base material having an electrical insulation. Examples of a material for a transparent base material include a transparent resin material and a transparent inorganic material.

Specific examples of the transparent resin material include acetyl cellulose resins such as triacetyl cellulose, polyester resins such as polyethylene terephthalate (PET) and polyethylene naphthalate (PEN), olefin resins such as polyethylene (PE), polymethylpentene, cycloolefin polymer (COP), and cycloolefin copolymer (COC), acrylic resins such as polymethyl methacrylate, polyurethane resins, polyethersulfone, polycarbonate, polysulfone, polyether, polyetherketone, acrylonitrile, methacrylonitrile, and the like. The thickness of the transparent resin material is preferably 20 to 200 µm.

Specific examples of the transparent inorganic material include glass such as alkali-free glass, alkali glass, chemically tempered glass, soda glass, potash glass, and lead glass, ceramics such as translucent piezoelectric ceramics (lead lanthanum zirconate titanate (PLZT)), quartz, fluorite, sapphire, and the like. The thickness of the transparent inorganic material is preferably 0.1 to 1.3 mm.

The light transmittance of the substrate 12 is preferably 40% to 100%. The light transmittance is measured by using "plastic—a method of obtaining total light transmittance and total light reflectance" regulated in JIS K 7375:2008.

One of preferred aspects of the substrate 12 is a treated substrate that has been subjected to at least one treatment selected from the group consisting of an atmospheric pressure plasma treatment, a corona discharge treatment, and an ultraviolet irradiation treatment. By performing the above-described processing, in the treated substrate 12, a hydrophilic group such as an OH group is introduced to the front surface on which the first electrode 14 and the second electrode 16 are provided, and adhesiveness between the first electrode 14 and the second electrode 16 is improved. Among the above treatments, in view of improving the adhesiveness between the first electrode 14 and the second electrode 16, an atmospheric pressure plasma treatment is preferable.

Another preferred aspect of the substrate 12 preferably has a base layer including a polymer on a surface on which the first electrode 14 and the second electrode 16 are provided. By forming the first electrode 14 and the second electrode 16 on the base layer, the adhesiveness of the first electrode 14 and the second electrode 16 with the substrate 12 is further improved.

A method of forming the base layer is not particularly limited, but examples thereof include a method of coating a substrate with a composition for forming a base layer including a polymer, and performing a heat treatment, if necessary. The composition for forming a base layer may include a solvent, if necessary. The kind of the solvent is not particularly limited. Further, as the composition for forming a base layer including a polymer, gelatin, an acrylic resin, a urethane resin, or an acrylic styrene latex including inorganic or polymer fine particles may be used.

The thickness of the base layer is not particularly limited, but in view of causing the adhesiveness of the first electrode 14 and the second electrode 16 with the substrate 12 to be excellent, the thickness is preferably 0.02 to 2.0 µm and more preferably 0.03 to 1.5 µm.

Further, in addition to the base layer described above, for example, an ultraviolet absorbing layer may be provided as another layer between the substrate 12, and the first electrode 14 and the second electrode 16, as necessary.

<Fine Metal Wire>

The line width wt of the fine metal wire 30 is preferably 0.5 µm or more and 10 µm or less. From a viewpoint of a resistance value and a visibility, the line width is more preferably 1 µm or more and 5 µm or less.

The thickness t of the fine metal wire 30 is not particularly limited, but is preferably 0.01 to 9 µm, more preferably 0.05 to 5 µm, and most preferably 0.5 µm or more and 2 µm or less. In a case where it is the above-mentioned range, the electrode excellent in durability can be comparatively easily formed by using a low resistance electrode.

In measurement of the line width wt and the thickness t of the fine metal wire 30, first, a cross section image of the fine metal wire 30 is acquired using a scanning electron microscope. Next, the line width wt and the thickness t of the fine metal wire 30 are obtained from the cross section image.

The first mesh cell 32 and the second mesh cell 32a which are constituted by the fine metal wire 30 intend the closed shape constituted by the intersecting fine metal wire 30, as shown in FIGS. 3 and 4. The shape of each of the first mesh cell 32 and the second mesh cell 32a is not particularly limited, but may be a triangle such as a regular triangle, an isosceles triangle, and a right triangle, a quadrangle such as a square, a rectangle, a rhombus, a parallelogram, and a trapezoid, a (regular) n-polygon such as a (regular) hexagon and a (regular) octagon, and a geometrical figure obtained by combining a circle, an ellipse, a star, and the like or may be a random polygonal shape. Among them, the rhombus is most preferable because it can achieve both moire reduction with the pixel pattern of the display panel and color noise suppression. In the case of the rhombus, the acute angle of the rhombus is preferably 20° to 70°, and in particular, more preferably 400 to 700.

The length of one side of each of the first mesh cell 32 and the second mesh cell 32a is preferably 150 µm or more and 1200 µm or less, more preferably 300 µm or more and 1200 µm or less, and still more preferably 700 µm or more and 1100 µm or less.

From a viewpoint of visible light transmittance, the opening ratio of each of the first electrode 14 and the second electrode 16 is preferably 85% or more, more preferably 90% or more, and still more preferably 95% or more. The opening ratio of the electrode corresponds to the unoccupied area ratio of the fine metal wires 30 in the electrode.

The pattern constituted by the first mesh cell 32 and the second mesh cell 32a is not limited to a standard regular pattern, but may be an irregular pattern. In the case of an irregular pattern, it is possible to make the plurality of mesh cells included in the pattern as a cell of a polygonal shape, particularly, a quadrilateral shape such as a parallelogram having a length of an irregular side of −10% to +10% with respect to an average value of lengths of sides of the respective cells.

In a case where the above irregular pattern is used for a touch panel, moire can be suppressed, color noise can be reduced, and a visibility can be improved.

Further, an in-mesh dummy pattern insulated from the first mesh cell 32 and the second mesh cell 32a may be provided inside the first mesh cell 32 and the second mesh cell 32a. As the shape of the in-mesh dummy pattern, for example, a dummy pattern disclosed in a patent specification filed as JP2017-042090 can be used.

Examples of the metal constituting the fine metal wire 30 include metals such as gold (Au), silver (Ag), copper (Cu), molybdenum (Mo), and aluminum (Al), or alloys thereof. Among these, silver is preferable because the conductivity of the fine metal wire is excellent.

It is preferable that the binder is contained in the fine metal wire 30, from a viewpoint of the adhesiveness of the fine metal wire and the substrate 12.

As the binder, a resin is preferable because the adhesiveness between the fine metal wire and the substrate 12 is more excellent, and more specifically, at least one resin selected from the group consisting of gelatin, a (meth)acrylic resin, a styrene resin, a vinyl resin, a polyolefin resin, a polyester resin, a polyurethane resin, a polyamide resin, a polycarbonate resin, a polydiene resin, an epoxy resin, a silicone resin, a cellulose polymer, and a chitosan polymer, or a copolymer including a monomer constituting these resins is exemplified.

The fine metal wire is not limited to that constituted by each of the above-described metals or alloys thereof, but may be, for example, metal oxide particles, a metal paste such as a silver paste and a copper paste, and metal nanowire particles such as a silver nanowire and a copper nanowire.

Further, the fine metal wire may have a single layer structure or a multilayer structure. As the fine metal wire, for example, a structure in which a copper oxynitride layer, a copper layer, and a copper oxynitride layer are sequentially laminated, a structure in which molybdenum (Mo), aluminum (Al), and molybdenum (Mo) are sequentially laminated, or a structure in which molybdenum (Mo), copper (Cu), and molybdenum (Mo) are sequentially laminated can be employed.

In order to reduce the reflectance of the fine metal wire, the surface of the fine metal wire may be formed by blackening treatment, that is, sulfidation or oxidation treatment. Furthermore, a configuration in which a blackening layer which makes the fine metal wire difficult to be seen is provided may be sufficient. The blackening layer is, for example, for reducing the reflectance of the fine metal wire. The blackening layer can be formed of copper nitride, copper oxide, copper oxynitride, molybdenum oxide, AgO, Pd, carbon or other nitrides or oxides. The blackening layer is arranged on the side where the fine metal wire is visually recognized, that is, on the touch surface side.

<Manufacturing Method>

A manufacturing method of the fine metal wire 30, the auxiliary fine metal wire 35, the non-electrically connected fine metal wire 14d, the first edge part wire 17 and the second edge part wire 19 is particularly limited as long as a wire can be formed on the substrate 12 or the like, but a plating method described in JP2014-159620A, JP2012-144761A. or the like, a silver salt method described in JP2012-006377A. JP2014-112512A, JP2014-209332A, JP2015-022397A, JP2016-192200A, WO2016/157585A, or the like, a vapor deposition method described in JP 2014-029614A or the like, and a printing method using conductive ink described in JP 2011-028985A or the like can be appropriately used.

<Auxiliary Fine Metal Wire>

The auxiliary fine metal wire 35 can have the same configuration as the fine metal wire 30 and can be manufactured by the same manufacturing method as the fine metal wire. The line width ws of the auxiliary fine metal wire 35 is not particularly limited, but is preferably 50 µm or less, and in particular, preferably 0.5 µm or more and 30 µm or less. As described above, it is preferable that the line width ws of the auxiliary fine metal wire 35 is different from the line width wt of the fine metal wire 30.

The thickness t of the auxiliary fine metal wire 35 is not particularly limited, but is preferably 0.01 µm or more and 9 µm in or less. The thickness t of the auxiliary fine metal wire 35 may be the same as or different from the thickness t of the fine metal wire 30. Since the resistance of the first electrode 14 can be reduced by increasing the thickness t of the auxiliary fine metal wire 35, the thickness t of the auxiliary fine metal wire 35 is more preferably larger than the thickness t of the fine metal wire 30 and still more preferably 1.2 times or more the thickness t of the fine metal wire 30.

The line width ws and thickness t of the auxiliary fine metal wire 35 can be measured in the same manner as the fine metal wire 30 described above. A cross section image of the auxiliary fine metal wire 35 is acquired by using a scanning electron microscope, and the line width ws and thickness t of the auxiliary fine metal wire 35 are obtained from the cross section image.

<Non-Electrically Connected Fine Metal Wire>

The non-electrically connected fine metal wire 14d can have the same configuration as the fine metal wire 30 and can be manufactured by the same manufacturing method as the fine metal wire. The line width and film thickness of the non-electrically connected fine metal wire 14d may be different from the line width wt and thickness t of the fine metal wire 30, but are preferably the same as each other.

<First Edge Part Wire and Second Edge Part Wire>

The line width of each of the first edge part wire 17 and the second edge part wire 19 is preferably 50 µm or less, more preferably 30 µm or less, and in particular, preferably 15 µm or less. A gap (space) of each of the first edge part wire 17 and the second edge part wire 19 is preferably 50 µm or less, more preferably 30 µm or less, and in particular, preferably 15 µm or less. It is preferable that the line width and the interval are in the above-mentioned range because the regions of the first edge part wire 17 and the second edge part wire 19 can be narrowed.

The first edge part wire 17 and the second edge part wire 19 can also be formed by the above-described manufacturing method of a wire. The fine metal wire 30 of the first electrode 14, the first edge part wire 17, and the auxiliary fine metal wire 35 can be formed of the same material and at the same time in the same process, and the fine metal wire 30 of the second electrode 16 and the second edge part wire 19 can be formed of the same material and at the same time in the same process. In this case, the thickness of the first edge part wire 17, the thickness of the fine metal wire 30 of the first electrode 14, and the thickness of the auxiliary fine metal wire 35 may be the same as one another. Similarly, the thickness of the second edge part wire 19 and the thickness of the fine metal wire 30 of the second electrode 16 may be the same as each other.

<Protective Layer>

A transparent protective layer may be formed on the first electrode 14 and the second electrode 16. As the protective layer, an organic film of gelatin, an acrylic resin, a urethane resin, an acrylic styrene latex, or the like, and an inorganic film of silicon dioxide or the like can be used, and the film thickness is preferably 10 nm or more and 100 nm or less.

In addition, as necessary, a transparent coating layer may be formed on the protective layer. As the transparent coating layer, an organic film of an acrylic resin, a urethane resin, or the like is used, and the film thickness thereof is preferably 1 µm or more and 100 µm or less.

<Edge Part Wire Insulating Film>

For the purpose of preventing a short circuit between the edge part wires and corrosion of the edge part wire, an edge part wire insulating film may be formed on the first edge part wire 17 and the second edge part wire 19 as illustrated in FIG. 1. As the edge part wire insulating film, an organic film of an acrylic resin, a urethane resin, or the like is used, and the film thickness is preferably 1 µm or more and 30 µm or less. The edge part wire insulating film may be formed only on any one of the first edge part wire 17 and the second edge part wire 19.

The present invention basically has the configuration as above. In the above, the conductive member for a touch panel and the touch panel according to the present invention have been described, but the present invention is not limited to the above described embodiments, and it is obvious that various improvements and modifications may be performed without departing from the gist of the present invention.

EXAMPLES

Hereinafter, the features of the present invention will be described more specifically with reference to the examples. The materials, reagents, amounts used, substance amounts, proportions, treatment details, treatment procedures, or the like described in the following examples can be appropriately changed without departing from the gist of the present invention. Accordingly, the scope of the present invention is not construed by the specific examples shown below restrictively.

In this example, touch panels of Examples 1 to 7 and Comparative Examples 1 and 2 were produced, and a uniformity and a visibility of a detection sensitivity were evaluated. The results are shown in Table 1 below Hereinafter, a uniformity and a visibility of a detection sensitivity will be described.

<Uniformity of Detection Sensitivity>

A distal end portion of a touch pen in which an outer diameter of the distal end portion was 1.0 mm was brought in contact with the manufactured touch panel, so as to perform evaluation of a uniformity of a detection sensitivity of the touch panel. At this point, based on the position detection accuracy with respect to the contact position between the center portion and an outer peripheral portion of the touch panel and the distal end portion of the touch pen, evaluation standards of A to D were determined as follows. In a case where the evaluation was A or B, it was determined that position detection accuracy is not problematic in practical use.

In addition, the center portion of the touch panel was set to a region at an inner side of 4 mm from an edge of a detection region of the touch panel in the detection region of the touch panel, and the outer peripheral portion of the touch panel was set as a portion other than the center portion of the touch panel from an entire detection region of the touch panel.

A: a very excellent level; the position detection accuracy is less than 1.0 mm in both the center portion and the outer peripheral portion of the touch panel, and high accuracy position detection can be performed in the entire detection region of the touch panel.

B: an excellent level without a problem in practical use; position detection accuracy of the center portion of the touch panel is less than 1.0 mm, position detection accuracy of a part of the outer peripheral portion of the touch panel is 1.0 mm or more and less than 2.0 mm, and high accuracy position detection can be performed over the entire detection region of the touch panel.

C: a level with a problem in practical use: position detection accuracy of the center portion of the touch panel is less than 1.0 mm, detection accuracy of a part of the outer peripheral portion of the touch panel is 2.0 mm or more, and there is a problem in position detection accuracy of the outer peripheral portion of the touch panel.

D: a level with a serious problem in practical use; there is a portion where position detection cannot be performed on the outer peripheral portion of the touch panel.

<Visibility Evaluation>

The manufactured touch panel was observed with bare eyes of 10 observers at a position spaced by 5 cm from the front surface of the touch panel, so as to evaluate whether a pattern shape of the electrode and an auxiliary fine metal wire were recognized. With respect to a visibility, the evaluation standards of A to C were obtained as follows, the most frequent evaluation result among the evaluation results of 10 observers was set as a final evaluation result with respect to the touch panel.

A: the pattern shape of the electrode and the auxiliary fine metal wire are not visually recognized at all.

B: the pattern shape of the electrode is not visually recognized, but the auxiliary fine metal wire is visually recognized.

C: the pattern shape of the electrode and the auxiliary fine metal wire are visually recognized.

Hereinafter, the touch panel of the present example will be described.

<Manufacturing of Touch Panel>

Various photo masks with different exposure patterns were prepared, and a plurality of first electrodes and a plurality of second electrodes constituted by a fine metal wire were respectively formed on both surfaces of the transparent insulating substrate, so as to manufacture a conductive member. Examples 1 to 5 have an auxiliary fine metal wire, and a photo mask for forming the first electrode has a pattern of the auxiliary fine metal wire.

Further, as the transparent insulating substrate of the conductive member, a polyethylene terephthalate film having a thickness of 38 μm was used, and a fine metal wire was formed of a silver wire. In addition, in the plurality of first electrodes and the plurality of second electrodes, the line width of the mesh, that is, the line width of each of the plurality of fine metal wires, was set to 4.0 μm, and a rhombus mesh shape with an acute angle of 60 degrees and a side length of 750.5 μm was adopted as the mesh shape of the first mesh cell and the second mesh cell. Further, the first mesh pitch $P_1$ is 1300 μm, and the second mesh pitch $P_2$, which is a pitch of the second mesh cell in the first direction D1, is 750.5 μm. Further, the first mesh cell and the second mesh cell are arranged so that a vertex of the second mesh cell is located at the centroid of the first mesh cell, and the dummy electrode is provided between the first electrodes and between the second electrodes as shown FIGS. 3 and 4.

Further, the manufactured conductive member was bonded to a cover panel made of tempered glass having a thickness of 1.1 mm, by using an optical transparent pressures sensitive adhesive sheet having a thickness of 75 μm and made of 8146-4 (model number) manufactured by 3M Company, so as to manufacture a touch panel.

In the touch panel, the electrode width Wa of each of all the first electrodes is the same, as being 1.95 mm and has a relationship with the first mesh pitch $P_1$ of $Wa=1.5P_1$. Further, the electrode width Wb of each of all the second electrodes is the same, as being 2.90 mm and has a relationship with the second mesh pitch $P_2$ of $Wb=3.9P_2$.

Further, the first electrode was used as a sensing electrode and the second electrode was used as a drive electrode, and thus the touch panel was driven as a mutual capacitive touch panel.

Hereinafter, a method of manufacturing the conductive member will be described.

(Preparation of Silver Halide Emulsion)

The following solutions 2 and 3 were added by an amount corresponding to each 90% thereof to the following solution 1 kept at a temperature of 38° C. and pH (potential of hydrogen) of 4.5 with stirring over 20 minutes, so as to form nuclear particles of 0.16 μm. Subsequently, the following solutions 4 and 5 were added over 8 minutes, and the following solutions 2 and 3 were added by a remaining amount of each 10% thereof over 2 minutes, so as to grow particles to 0.21 μm. Further, 0.15 g of potassium iodide was added and aged for 5 minutes so as to complete particle formation.

Solution 1:
  Water . . . 750 ml (milliliter)
  Gelatin . . . 9 g
  Sodium chloride . . . 3 g
  1,3-Dimethylimidazolidine-2-thione . . . 20 mg
  Sodium benzenethiosulfonate . . . 10 mg
  Citric acid . . . 0.7 g
Solution 2:
  Water . . . 300 ml
  Silver nitrate . . . 150 g
Solution 3:
  Water . . . 300 ml
  Sodium chloride . . . 38 g
  Potassium bromide . . . 32 g
  Potassium hexachloroiridate(III) (0.005% KCl 20% aqueous solution) . . . 8 ml
  Ammonium hexachlororhodate (0.001% NaCl 20% aqueous solution) . . . 10 ml
Solution 4:
  Water . . . 100 ml
  Silver nitrate . . . 50 g
Solution 5:
  Water . . . 100 ml
  Sodium chloride . . . 13 g
  Potassium bromide . . . 11 g
  Yellow prussiate of potash . . . 5 mg Thereafter, washing with water was performed by a flocculation method according to a general method. Specifically, the temperature was decreased to 35° C., 3 liters of distilled water was added, and sulfuric acid was used to lower the pH until the silver halide was precipitated (in the range of pH 3.6±0.2). Next, about 3 liters of supernatant was removed (first washing with water). Additional 3 liters of distilled water was added, and sulfuric acid was added, until the silver halide was precipitated. Again, 3 liters of supernatant was removed (second washing with water). The same operation as the second washing with water was further repeated one more time (third washing with water) to complete a water washing-desalting step. An emulsion after washing and desalting was adjusted to pH 6.4 and pAg 7.5, 3.9 g of gelatin, 10 mg of sodium benzenethiosulfonate, 3 mg of sodium benzenethiosulfinate, 15 mg of sodium thiosulfate, and 10 mg of chloroauric acid were added, chemical sensitization was performed so as to obtain an optimum sensitivity at 55° C., and 100 mg of 1,3,3a,7-tetraazaindene as a stabilizer and 100 mg of PROXEL (trade name, manufactured by ICI Co., Ltd.) as a preservative were added. The finally obtained emulsion was a silver iodochlorobromide cubic grain emulsion including 0.08 mol % of silver iodide, having a proportion of silver chlorobromide of 70 mol % of silver chloride and 30 mol % of silver bromide, and having an average particle diameter of 0.22 μm and a coefficient of variation of 9%.

(Preparation of Composition for Forming Photosensitive Layer)

$1.2 \times 10^{-4}$ mol/mol Ag of 1,3,3a,7-tetraazaindene, $1.2 \times 10^{-2}$ mol/mol Ag of hydroquinone, $3.0 \times 10^{-4}$ mol/mol Ag of citric acid, 0.90 g-mol Ag of 2,4-dichloro-6-hydroxy-1,3,5-triazine sodium salt, and a slight amount of a hardener were added to the above emulsion, and pH of the coating solution was adjusted to 5.6 by using citric acid.

A polymer latex containing a polymer represented by (P-1) and a dispersing agent consisting of dialkylphenyl PEO sulfate ester (a mass ratio of dispersing agent/polymer is 2.0/100=0.02) was added to the above coating solution such that polymer/gelatin (mass ratio)=0.5/1 is satisfied with respect the containing gelatin.

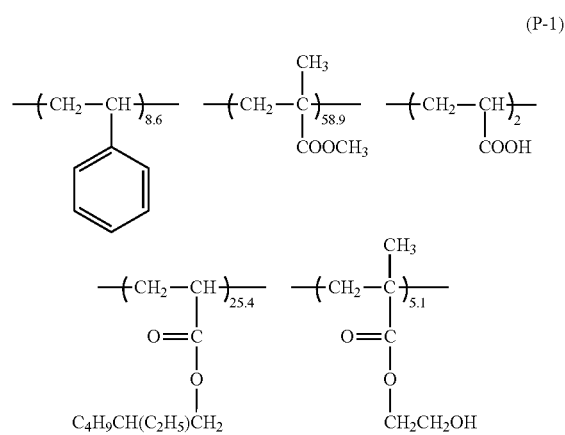

(P-1)

EPOXY RESIN DY 022 (trade name: manufactured by Nagase ChemteX Corp.) was added as a crosslinking agent. The addition amount of the crosslinking agent was adjusted such that the amount of the crosslinking agent in the photosensitive layer described below is 0.09 g/m².

The composition for forming a photosensitive layer was prepared as above.

The polymer represented by (P-1) described above was synthesized with reference to JP3305459B and JP3754745B.

(Photosensitive Layer Formation Step)

Both surfaces of the transparent insulating substrate were coated with the above polymer latex, so as to provide an undercoat layer having a thickness of 0.05 μm. As the transparent insulating substrate, polyethylene terephthalate film of 38 μm (manufactured by Fujifilm Corporation) was used.

Next, an antihalation layer consisting of a mixture of the above polymer latex, gelatin, and a dye having an optical density of about 1.0 and being decolorized by alkali of a developer was provided on the undercoat layer. The mixing mass ratio (polymer/gelatin) of the polymer and the gelatin was 2/1, and the content of the polymer was 0.65 g/m².

The antihalation layer was coated with the composition for forming a photosensitive layer and was further coated with a composition obtained by mixing the polymer latex, gelatin, EPOCROSS K-2020E (trade name: manufactured by Nippon Shokubai Co., Ltd., oxazoline-based crosslinking reactive polymer latex (crosslinkable group: oxazoline group)), and SNOWTEX C (registered trademark, trade name: manufactured by Nissan Chemical Industries, Ltd., colloidal silica) at a solid content mass ratio (polymerigelatin/EPOCROSS K-2020E/SNOWTEX C (registered trademark)) of 1/1/0.3/2 such that the amount of gelatin is 0.08 g/m², so as to obtain a support on both surfaces of which photosensitive layers were formed. A support on both surfaces of which photosensitive layers were formed is referred to as a film A. The formed photosensitive layer had a silver content of 6.2 g/m² and a gelatin content of 1.0 g/m².

(Exposure and Development Step)

For example, a first photo mask for forming a first electrode having a pattern as illustrated in FIG. 3 and a second photo mask for forming a second electrode having a pattern as illustrated in FIG. 4 were respectively prepared, the first photo mask and the second photo mask were arranged on both surfaces of the above described film A, and the both surfaces were simultaneously exposed with parallel light by using a high pressure mercury lamp as a light source.

After the exposure, development treatment was performed by using the following developer, and development treatment was further performed by using a fixing solution (trade name: N3X-R for CN16X, manufactured by Fujifilm Corporation). Rinsing with pure water was performed, and the water was dried, so as to obtain a support on both surfaces of which fine metal wires made of Ag (silver) and gelatin layers were formed. The gelatin layer was formed between the fine metal wires. The obtained film was referred to as a film B.

(Composition of Developer)

The following compounds were contained in 1 liter (L) of a developer.

Hydroquinone . . . 0.037 mol/L
N-methylaminophenol . . . 0.016 mol/L
Sodium metaborate . . . 0.140 mol/L
Sodium hydroxide . . . 0.360 mol/L
Sodium bromide . . . 0.031 mol/L
Potassium metabisulfite . . . 0.187 mol/L (Gelatin Degradation Treatment)

The film B was immersed in an aqueous solution (concentration of proteolytic enzyme: 0.5 mass %, solution temperature: 40° C.) of a proteolytic enzyme (BIOPLASE AL-15FG manufactured by Nagase ChemteX Corporation) for 120 seconds. The film B was extracted from the aqueous solution, immersed in warm water (solution temperature: 50° C.) for 120 seconds, and washed. The film after gelatin degradation treatment is referred to as a film C.

<Resistance Reduction Treatment>

A calender treatment was performed on the above described film C by using a calender device including metal rollers at a pressure of 30 kN. At this point, two polyethylene terephthalate films having a rough surface shape of line asperity Ra=0.2 μm, Sm=1.9 μm (measured with a shape analysis laser microscope VK-X110 manufactured by Kevence Corporation (JIS-B-0601-1994)) were transported such that the rough surfaces face the front and back surfaces of the above described film C, and the rough shapes were transferred and formed on the front and back surfaces of the above described film C.

After the above described calender treatment, this film was passed through an overheated steam tank at a temperature of 150° C. for 120 seconds to perform heat treatment. The film after the heat treatment is referred to as a film D. This film D is a conductive member.

Next, Examples 1 to 7 and Comparative Examples 1 and 2 are described.

Example 1

In Example 1, an auxiliary fine metal wire was provided in all the first electrodes, a line width of the fine metal wire was 4 μm, and a line width of the auxiliary fine metal wire was 4 μm. As the first electrode shown in FIG. 7, a total of two auxiliary fine metal wires were provided on the electrode outline of the first electrode. The auxiliary fine metal wire was a straight line parallel to the first direction and formed over the entire extension region of the first electrode. Further, no auxiliary fine metal wire is provided on the second electrode.

Example 2

Example 2 has the same configuration and manufacturing method as Example 1 except that an arrangement position of the auxiliary fine metal wire of the first electrode is not the electrode outline of the first electrode and is on an inner side of the first electrode in the second direction, as compared with Example 1. Example 2 has a configuration of the first electrode shown in FIG. 8.

Example 3

Example 3 has the same configuration and manufacturing method as Example 1 except that the number of the auxiliary fine metal wires of the first electrode is one, as compared with Example 1. Example 3 has a configuration of the first electrode shown in FIG. 9.

Example 4

Example 4 has the same configuration and manufacturing method as Example 1 except that a line width of the auxiliary fine metal wire is 3 μm, as compared with Example 1. Example 4 has a configuration of the first electrode shown in FIG. 7.

Example 5

Example 5 has the same configuration and manufacturing method as Example 1 except that a line width of the auxiliary fine metal wire is 3 μm and the number of the auxiliary fine metal wires of the first electrode is one, as compared with Example 1. Example 5 has a configuration of the first electrode shown in FIG. 9.

Example 6

In Example 6, a length of one side of each of the first mesh cell and the second mesh cell was 635.0 μm (first mesh pitch $P_1$=1100 μm, second mesh pitch $P_2$=635.0 μm), an electrode width Wa of the outermost first electrode of the first electrodes was 1.1 mm (=$P_1$), and an electrode width Wa of each of other first electrodes was 2.86 mm (=2.6$P_1$), as compared with Example 1. Example 6 is the same as Example 1 except that an electrode width Wb of the outermost second electrode of the second electrodes is 1.52 mm (=2.4$P_2$), an electrode width Wb of each of the other second electrodes is 2.98 mm (=4.7$P_2$), the auxiliary fine metal wire of FIG. 7 is provided on the outermost first electrode and the outermost second electrode, and a line width of the auxiliary fine metal wire is 10 μm.

Example 7

Example 7 is the same as Example 6, except that the auxiliary fine metal wire and the connecting fine metal wire of FIG. 14 are provided on the outermost first electrode and the outermost second electrode, and a line width of each of the auxiliary fine metal wire and the connecting fine metal wire is 10 μm, as compared with Example 6.

Comparative Example 1

Comparative Example 1 has the same configuration and manufacturing method as Example 1 except that the auxiliary fine metal wire is not provided in the first electrode, as compared with Example 1.

Comparative Example 2

Comparative Example 2 is the same as Example 6 except that the auxiliary fine metal wire is not provided, as compared with Example 6.

In addition, "-" shown in a column of "Line width of auxiliary fine metal wire" and "Number of auxiliary fine metal wires" in Table 1 below indicates that no auxiliary fine metal wire is provided, and "-" shown in a column of "Line width of connecting fine metal wire" indicates that no connecting fine metal wire is provided.

TABLE 1

| | Line width of fine metal wire (μm) | Line width of auxiliary fine metal wire (μm) | Line width of connecting fine metal wire (μm) | The number of auxiliary fine metal wires | Uniformity of detection sensitivity | Visibility |
|---|---|---|---|---|---|---|
| Example 1 | 4 | 4 | — | 2 | A | C |
| Example 2 | 4 | 4 | — | 2 | A | C |
| Example 3 | 4 | 4 | — | 1 | A | B |
| Example 4 | 4 | 3 | — | 2 | A | B |
| Example 5 | 4 | 3 | — | 1 | A | A |
| Example 6 | 4 | 10 | — | 1 | A | B |
| Example 7 | 4 | 10 | 10 | 1 | A | B |
| Comparative Example 1 | 4 | — | — | — | D | A |
| Comparative Example 2 | 4 | — | — | — | D | A |

As shown in Table 1, in Examples 1 to 5, a uniformity of a detection sensitivity was excellent compared to that of Comparative Example 1 even though the electrode width was small. In addition, a visibility of Example 5 was also comparable to that of Comparative Example 1 in which there was no auxiliary fine metal wire. A visibility was improved by making the auxiliary fine metal wire finer than the fine metal wire.

As shown in Table 1, in Examples 6 and 7, similarly to in Examples 1 to 5, a uniformity of a detection sensitivity was superior to that of Comparative Example 2. Moreover, although a visibility of each of Example 6 and Example 7 is worse than that of Example 5, the auxiliary fine metal wire and the connecting fine metal wire are in a position overlapping with the decorative layer of the touch panel, and as the touch panel, there no problem in a substantial visibility.

EXPLANATION OF REFERENCES

10: touch panel
11: conductive member for touch panel
12: substrate
12a, 52a: front surface
12b: back surface
12c, 12e, 12f: edge
13: transparent insulating film
13a: first surface
14: first electrode
14b: inter-electrode
14c: electrode outline
14d: non-electrically connected fine metal wire
15: first external connection terminal
16: second electrode
17: first edge part wire
18: second external connection terminal
19: second edge part wire
20: controller
22: wire
30: fine metal wire
32: first mesh cell
32a: second mesh cell
33: extension line
34: closed shape
35: auxiliary fine metal wire
36: connecting fine metal wire
38: transparent layer
40, 41: dummy electrode
40a, 41a: dummy pattern
50: transparent layer
52: cover layer
D1: first direction
D2: second direction
E: sensing region
H: intersection
$P_1$: first mesh pitch
Wa: electrode width of first electrode
Wb: electrode width of second electrode
ws: line width of auxiliary fine metal wire
wt: line width of fine metal wire
g: centroid
t: thickness
β: angle between auxiliary fine metal wire and fine metal wire
θ: angle between fine metal wire and first direction

What is claimed is:

1. A conductive member for a touch panel, comprising:
a substrate; and
a plurality of first electrodes which are detection electrodes, formed on the substrate and extending in parallel to a first direction,
wherein:
the plurality of first electrodes are formed by electrically connecting a plurality of first mesh cells constituted by a fine metal wire,
an angle θ between the fine metal wire and the first direction satisfies 0°<θ<90° or 90° <θ<180°,
the plurality of first electrodes have at least one auxiliary fine metal wire extending in the first direction, intersecting the fine metal wire, and electrically connected to the fine metal wire,
an angle β between the auxiliary fine metal wire and the fine metal wire satisfies 0°<β<180°,
a total length of the auxiliary fine metal wires included in the plurality of first electrodes in the first direction is 50% to 250% of a length of the plurality of first electrodes, and a length of one auxiliary fine metal wire included in the plurality of first electrodes in the first direction is 25% to 100% of a length of the plurality of first electrodes,
in the plurality of first electrodes, an electrode width Wa that is a minimum width in a second direction orthogonal to the first direction and a first mesh pitch $P_1$ of the first mesh cell in the second direction satisfy Wa≤2.5$P_1$,
wherein an electrode width Wa of a first electrode which is arranged on the outermost side in the second direction among the plurality of the first electrodes is smaller than an electrode width Wa of the other plurality of first electrodes,
wherein the first mesh pitch $P_1$ is an average value of distances in the second direction between centroids of two first mesh cells adjacent to each other in the second direction, and
on condition that two first mesh cells are not arranged adjacent to each other in the second direction in the plurality of first electrodes, a virtual centroid of a closed shape surrounded using an extension line formed by extending the fine metal wire constituting the first mesh cell in an extending direction is regarded as the centroid of the first mesh cell;
wherein the conductive member for a touch panel further includes:
a connecting fine metal wire that connects the auxiliary fine metal wire and the fine metal wire with each other, and
wherein an angle between the connecting fine metal wire and the auxiliary fine metal wire is not a constant value.

2. The conductive member for a touch panel according to claim 1,
wherein the electrode width Wa of the first electrode in the second direction and the first mesh pitch $P_1$ satisfy Wa≤1.5$P_1$.

3. The conductive member for a touch panel according to claim 2,
wherein the auxiliary fine metal wire is arranged in an electrode outline of the plurality of first electrodes in the second direction.

4. The conductive member for a touch panel according to claim 3,
wherein a line width of the auxiliary fine metal wire is smaller than a line width of the fine metal wire.

5. The conductive member for a touch panel according to claim 4,
wherein the plurality of first electrodes have only one auxiliary fine metal wire.

6. The conductive member for a touch panel according to claim 5,
wherein the auxiliary fine metal wire is a straight line and is parallel to the first direction.

7. The conductive member for a touch panel according to claim 1, wherein the auxiliary fine metal wire is arranged in an electrode outline of the plurality of first electrodes in the second direction.

8. The conductive member for a touch panel according to claim 7,
wherein a line width of the auxiliary fine metal wire is larger than a line width of the fine metal wire.

9. The conductive member for a touch panel according to claim 8,
wherein the plurality of first electrodes have only one auxiliary fine metal wire.

10. The conductive member for a touch panel according to claim 9,
wherein the auxiliary fine metal wire is a straight line and is parallel to the first direction.

11. A touch panel comprising the conductive member for a touch panel according to claim 10 and an opaque decorative layer,
wherein the auxiliary fine metal wire of the conductive member for a touch panel overlaps with the decorative layer in plan view.

12. The conductive member for a touch panel according to claim 1,
wherein a line width of the auxiliary fine metal wire is different from a line width of the fine metal wire.

13. The conductive member for a touch panel according to claim 1,
wherein a line width of the auxiliary fine metal wire is smaller than a line width of the fine metal wire.

14. The conductive member for a touch panel according to claim 1,
wherein a line width of the auxiliary fine metal wire is larger than a line width of the fine metal wire.

15. The conductive member for a touch panel according to claim 1,
wherein the plurality of first electrodes have only one auxiliary fine metal wire.

16. The conductive member for a touch panel according to claim 1,
wherein the auxiliary fine metal wire is a straight line and is parallel to the first direction.

17. The conductive member for a touch panel according to claim 1,
wherein the auxiliary fine metal wire is arranged in an electrode outline of the plurality of first electrodes in the second direction, and the plurality of first electrodes have only one auxiliary fine metal wire.

18. The conductive member for a touch panel according to claim 1,
wherein the angle between the connecting fine metal wire and the auxiliary fine metal wire is random or has a non-periodicity.

19. A touch panel comprising the conductive member for a touch panel according to claim 1.

20. The touch panel according to claim 19, further comprising:
an opaque decorative layer,
wherein the auxiliary fine metal wire of the conductive member for a touch panel overlaps with the decorative layer in plan view.

21. A touch panel comprising the conductive member for a touch panel according to claim 1 and an opaque decorative layer,
wherein the auxiliary fine metal wire of the conductive member for a touch panel overlaps with the decorative layer in plan view.

* * * * *